(12) United States Patent
Monzen et al.

(10) Patent No.: US 11,701,722 B2
(45) Date of Patent: Jul. 18, 2023

(54) RECIPROCATING TOOL

(71) Applicant: KOKI HOLDINGS CO., LTD., Tokyo (JP)

(72) Inventors: Tetsuya Monzen, Hitachinaka (JP); Ryosuke Nakano, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 551 days.

(21) Appl. No.: 16/618,032

(22) PCT Filed: Apr. 27, 2018

(86) PCT No.: PCT/JP2018/017227
§ 371 (c)(1),
(2) Date: Nov. 27, 2019

(87) PCT Pub. No.: WO2018/221105
PCT Pub. Date: Dec. 6, 2018

(65) Prior Publication Data
US 2020/0094432 A1 Mar. 26, 2020

(30) Foreign Application Priority Data

May 31, 2017 (JP) ................................. 2017-108373
Dec. 28, 2017 (JP) ................................. 2017-254184
Mar. 30, 2018 (JP) ................................. 2018-069786

(51) Int. Cl.
*B27B 3/26* (2006.01)
*B23D 51/10* (2006.01)
(Continued)

(52) U.S. Cl.
CPC ............. *B23D 51/16* (2013.01); *B23D 51/10* (2013.01); *B25F 5/006* (2013.01); *B27B 3/26* (2013.01);
(Continued)

(58) Field of Classification Search
CPC ...... B23D 51/10; B23D 51/16; B23D 49/162; B23D 49/165; Y10T 74/18256; B25F 5/006; B27B 19/09; B27B 3/26
(Continued)

(56) References Cited

U.S. PATENT DOCUMENTS 2,240,755 A * 5/1941 Briggs .................... B23D 59/04
30/394
2,428,924 A * 10/1947 Albertson ............ A01D 34/305
74/604

(Continued)

FOREIGN PATENT DOCUMENTS

CN 103717337 A 4/2014
CN 203956218 U 11/2014
(Continued)

OTHER PUBLICATIONS

International Preliminary Report on Patentability dated Dec. 3, 2019 by the International Bureau of WIPO in PCT Application PCT/JP2018/017227 (English Translation of the Written Opinion).
(Continued)

*Primary Examiner* — Laura M Lee
(74) *Attorney, Agent, or Firm* — NovoTechIP International PLLC

(57) ABSTRACT

Providing a reciprocating tool capable of reducing vibrations generated during operations and improving work performance and processing precision. A reciprocating tool includes a transmission gear part 61 and a counter weight part 62. The transmission gear part 61 includes a bevel gear 611 and a weight 611A. The bevel gear 611 is rotatable in a first direction about an axis B by receiving a drive force of a motor 3. The weight 62A is rotatable in a second direction opposite to the first direction about the axis B by receiving the drive force of the motor 3. A center of gravity 61G of the transmission gear part 61 and a center of gravity 62G of the
(Continued)

counter weight part 62 are separated farthest from a blade mounting part 8 when the blade mounting part 8 is positioned in a rearward position. The center of gravity 61G of the transmission gear part 61 and the center of gravity 62G of the counter weight part 62 are closest to the blade mounting part 8 when the blade mounting part 8 is positioned in a forward position.

14 Claims, 20 Drawing Sheets

(51) Int. Cl.
    *B23D 51/16*     (2006.01)
    *B27B 19/09*     (2006.01)
    *B25F 5/00*     (2006.01)

(52) U.S. Cl.
    CPC ......... *B27B 19/09* (2013.01); *Y10T 74/18256* (2015.01)

(58) Field of Classification Search
    USPC .......................................... 30/2, 278, 279.2
    See application file for complete search history.

(56) References Cited

U.S. PATENT DOCUMENTS

| | | | | |
|---|---|---|---|---|
| 2,610,524 | A * | 9/1952 | Maust | B30B 15/0064 74/603 |
| 2,704,941 | A * | 3/1955 | Holford | B23D 51/10 74/50 |
| 2,970,484 | A | 2/1961 | Springer | |
| 3,017,779 | A * | 1/1962 | Beals | F16F 15/26 74/50 |
| 3,270,369 | A * | 9/1966 | Mandell | B23D 51/10 452/160 |
| 3,457,796 | A * | 7/1969 | Waters | B23D 51/16 74/50 |
| 3,750,483 | A * | 8/1973 | Burrows | B23D 51/16 74/50 |
| 3,802,079 | A * | 4/1974 | Ketchpel, Jr | B23D 51/10 30/376 |
| 4,438,343 | A * | 3/1984 | Marken | F03B 13/20 290/53 |
| 6,327,923 | B1 * | 12/2001 | Greppmair | E02D 3/074 404/133.05 |
| 7,533,736 | B2 * | 5/2009 | Stirm | B25D 11/062 173/201 |
| 7,562,721 | B2 * | 7/2009 | Stirm | F16F 15/22 173/201 |
| 9,061,411 | B2 * | 6/2015 | Naughton | B23D 49/16 |
| 10,603,728 | B2 * | 3/2020 | Gall | B25F 5/02 |
| 10,960,475 | B2 * | 3/2021 | Gall | B23D 49/16 |
| 2002/0138991 | A1 | 10/2002 | Tachibana et al. | |
| 2008/0189961 | A1 * | 8/2008 | Oberheim | B23D 49/165 30/393 |
| 2010/0207990 | A1 | 8/2010 | Ito et al. | |
| 2012/0192438 | A1 * | 8/2012 | Aoki | B23D 51/16 30/392 |
| 2015/0033564 | A1 | 2/2015 | Kobori | |
| 2017/0136599 | A1 | 5/2017 | Aoki et al. | |
| 2018/0370012 | A1 * | 12/2018 | Zheng | B25F 5/006 |
| 2020/0398355 | A1 * | 12/2020 | Mougeotte | B25F 5/001 |

FOREIGN PATENT DOCUMENTS

| | | |
|---|---|---|
| CN | 106625446 A | 5/2017 |
| EP | 1502685 A1 | 2/2005 |
| JP | H05-006015 U | 1/1993 |
| JP | 2002098573 A | 4/2002 |
| JP | 2002283135 A1 | 10/2002 |
| JP | 2009298589 A | 12/2009 |
| JP | 2010023189 A | 2/2010 |
| JP | 2010208316 A | 9/2010 |
| JP | 2011115913 A | 6/2011 |
| JP | 2015229223 A | 12/2015 |

OTHER PUBLICATIONS

Office Action dated Jun. 8, 2021 in corresponding Japanese patent application No. 2019-522041 (English language translation provided).

Office Action dated May 15, 2020 in Corresponding CN Application 201880036887.6 (English Translation).

Supplementary European Search Report and Written Opinion dated Jan. 27, 2021 by the European Patent Office in European patent application No. 18810323.8.

International Search Report and Written Opinion dated Jul. 10, 2018 by the International Searching Authority (Japan Patent Office) in PCT Application PCT/JP2018/017227 (English Translation of the ISR).

Office Action dated Feb. 16, 2022 in corresponding Japanese patent application No. 2019-522041.

* cited by examiner

RECIPROCATING TOOL

TECHNICAL FIELD

The present disclosure relates to a reciprocating tool

BACKGROUND ART

Conventionally, reciprocating tools employing a saw blade for the tip tool have been widely used as power tools for cutting materials made of wood and steel, metal pipes, and the like (workpieces). One such reciprocating tool employing a saw blade for the tip tool is a saber saw that is provided with a motor, a gear that rotates when receiving a rotational force of the motor, a motion converting part that converts the rotational motion of the gear to reciprocating motion, and an output part supported in a housing so as to be capable of reciprocating and having a distal end in which the saw blade can be mounted (see Patent Document 1).

With this type of reciprocating tool, vibrations produced in the housing as the output part reciprocates are transmitted to the operator, potentially affecting work performance and processing precision.

For the saber saw described in Patent Document 1, a configuration providing a counterweight on the gear for cancelling vibrations in a front-rear direction is disclosed. The counterweight revolves in a plane parallel to the reciprocating direction of the output part in order to reduce the degree to which vibrations generated in the housing due to reciprocation of the output part are transmitted to the operator.

CITATION LIST

Patent Literature

Japanese Unexamined Utility Model Application Publication No. 1993-6015
[Patent Literature 1]

SUMMARY OF INVENTION

Technical Problem

However, with the saber saw described in Patent Document 1, the counterweight generates vibrations in a direction orthogonal to the reciprocating direction of the output part, potentially affecting work performance and processing precision.

Therefore, it is an object of the present invention to provide a reciprocating tool capable of reducing vibrations generated during operations and improving work performance and processing precision.

Solution to Problem

In order to attain the above and other objects, according to one aspect, the present invention provides a reciprocating tool including: a housing: a motor; an output part; a first rotary body; a motion converting part; and a second rotary body. The motor is accommodated in the housing and includes the rotating shaft. The output part is reciprocally movably supported by the housing between a first position and a second position. The first rotary body includes a first gear part and a first weight part. The first gear part is rotatable in a first direction about an axis extending in a predetermined direction by receiving a drive force of the motor. The first weight part is provided at the first gear part so as to rotate together with the first gear part. The motion converting part is interposed between the first gear part and the output part in a transmission path of the drive force of the motor. The motion converting part converts the rotational motion of the first gear part to the reciprocating motion of the output part. The second rotary body includes a second weight part. The second weight part is rotatable in a second direction about the axis by receiving the drive force of the motor. The second direction is opposite to the first direction. A center of gravity of the first rotary body and a center of gravity of the second rotary body are separated farthest from the output part when the output part is positioned in the first position. The center of gravity of the first rotary body and the center of gravity of the second rotary body are closest to the output part when the output part is positioned in the second position.

With this structure, since the center of gravity of the first rotary body and the center of gravity of the second rotary body are separated farthest from the output part when the output part is positioned in the first position and the center of gravity of the first rotary body and the center of gravity of the second rotary body are closest to the output part when the output part is positioned in the second position, suppressing vibrations in the reciprocating direction generated in the body of the reciprocating tool by the reciprocating motion of the output part can be achieved. Further, since the center of gravity of the first rotary body and the center of gravity of the second rotary body rotates in opposite directions from each other, suppressing vibrations in a direction orthogonal to the reciprocating direction generated in the body of the reciprocating tool can be achieved.

In the above-described reciprocating tool, preferably, the first rotary body further includes a protruding part protruding in a direction of the axis from the first gear part and a connecting part provided on a protruding end of the protruding part and connected to the motion converting part. The second rotary body further includes a second gear part provided with the second weight part. The second gear part is rotatable together with the second weight part in the second direction about the axis.

With this structure, since a center of gravity for the assembled body (first rotary body) of the first gear part, the protruding part, and the connecting part which rotate integrally and the center of gravity of the second rotary body rotates in opposite directions from each other, suppressing vibrations generated in the body of the reciprocating tool can be suitably achieved.

Preferably, the first rotary body further includes a rotary member rotatable together with the first gear part about the axis. The rotary member has a circular shape whose center is coincident with the axis, the rotary member has an outer edge portion in which that the vertical thickness varies along the circumferential direction. The rotary member has a center of gravity located on the axis.

With this structure, since the rotary member has the center of gravity located on the axis, suppressing vibrations generated in the body of the reciprocating tool can be achieved. Further, designing the center of gravity of the rotary member to be located on the axis enables a structure for reducing vibrations to be achieved through the simple method of merely finely adjusting the mass of each weight and the like on the first rotary body and the second rotary body.

Preferably, a first distance from the axis to the center of the gravity of the first rotary body is set different from a second distance from the axis to the center of the gravity of the second rotary body.

With this structure, the shape and arrangement of each weight provided at the first rotary body and the second rotary body can be designed freely to conform to the shape of the housing, and increasing freedom of design can be realized. In particular, since the center of gravity of the second rotary body is arranged closer to the axis, compacting the size of the body of the reciprocating tool can be realized.

Preferably, the second distance is shorter than the first distance.

With this structure, since the center of gravity of the first rotary body which connected to the output part through the motion converting part is not in proximity, but the center of gravity of the second rotary body is in proximity to the axis, compacting the size of the body of the reciprocating tool can be realized.

Preferably, the product of the first distance and a mass of the first weight part is equivalent to the product of the second distance and a mass of the second weight part.

With this structure, since each centrifugal force generated when the first rotary body and the second rotary body rotate can be cancelled each other, suppressing vibrations generated in the body of the reciprocating tool can be suitably achieved.

Preferably, reciprocal movement of the center of gravity of the first rotary body and the center of gravity of the second rotary body by rotational movement of the first rotary body and the second rotary body is directed in a direction which is opposite to the moving direction of the output part in the reciprocating direction.

With this structure, since the center of gravity of the first rotary body and the center of gravity of the second rotary body moves in a direction opposite to the moving direction of the output part, suppressing vibrations generated by reciprocating moving of the output part can be suitably achieved.

Preferably, the second gear part is separated farther from the output part than the first gear part is from the output part in the axial direction.

With this structure, the outer shape of the housing can be reduced in size since the relatively simple second gear part not connected to the motion converting part or output part is disposed outside the entire transmitting mechanism.

Preferably, the motor further includes a pinion fixed to the rotating shaft. The first gear part and the second gear part are meshed with the pinion, and the first gear part and the second gear part are disposed to face each other. The rotation shaft is positioned between the first gear part and the second gear part.

With this structure, a drive force can be transmitted directly from the pinion to the first gear part and second gear part without passing through other members. Further, this configuration enables a light weight and compact design of the reciprocating tool with an efficient layout.

Preferably, the second gear part has a diameter decreased in the axial direction with the increasing distance from the output part.

With this structure, since the diameter of the second gear part decreases as the distance from the output part increases, the outer shape of the housing can be reduced in size.

Preferably, the motion converting part is formed with a groove extending in a direction orthogonal to the reciprocating direction and the axial direction. The connecting part is movable in the groove.

With this structure, a simple construction can convert the circular motion of the first gear part to reciprocating part and transmit the drive force.

Preferably, the reciprocating tool further includes a third rotary body including a third weight part rotatable about the axis by receiving the drive force of the motor.

With this structure, three balance weights, i.e., the first weight part, the second weight part, and the third weight part can prevent vibrations generated by reciprocating motion of the output part. Further, by dividing the weight into three parts, weight and size of each divided weight can be reduced, and compacting the size of the body of the reciprocating tool can be realized.

Preferably, the third weight part is rotatable in the first direction. The center of gravity of the first rotary body, the center of gravity of the second rotary body, and a center of gravity of the third rotary body are separated farthest from the output part when the output part is positioned in the first position. The center of gravity of the first rotary body, the center of gravity of the second rotary body, and the center of gravity of the third rotary body are closest to the output part when the output part is positioned in the second position.

With this structure, since the center of gravity of the first rotary body, the center of gravity of the second rotary body, and the center of gravity of the third rotary body are separated farthest from the output part when the output part is positioned in the first position and the center of gravity of the first rotary body, the center of gravity of the second rotary body, and the center of gravity of the third rotary body are closest to the output part when the output part is positioned in the second position, suppressing vibrations in the reciprocating direction generated in the body of the reciprocating tool by the reciprocating motion of the output part can be achieved.

Preferably, reciprocal movement of a center of gravity of the first weight part, a center of gravity of the second weight part, and a center of gravity of the third weight part by rotational movement of the first rotary body, the second rotary body, and the third rotary body is directed in a direction which is opposite to the moving direction of the output part in the reciprocating direction, The second weight part is located between the first weight part and the third weight part in the axial direction.

With this structure, since the center of gravity of the first rotary body, the center of gravity of the second rotary body, and the center of gravity of the third rotary body moves in a direction opposite to the moving direction of the output part, suppressing vibrations generated by reciprocating moving of the output part can be achieved. Further, since the second weight part is positioned between the first weight part and the second weight part in the axial direction, moments around the reciprocating direction can be generated in directions that cancel each other. Therefore, reducing and preventing the occurrence of vibrations that rotates the body of the reciprocating tool around the reciprocating direction can be realized while maintaining the effect reducing the vibrations in the direction orthogonal to the reciprocating direction.

Advantage Effect of Invention

In the reciprocating tool according to the present invention, since vibrations generating during operations can be reduced, improvement of work performance and processing precision can be achieved.

BRIEF DESCRIPTION OF DRAWINGS

FIGS. 5A and 5B each are a view illustrating the gear part, the plunger and the blade mounting part of the saber saw according to the first embodiment of the present invention in a case where a reciprocating part is in a forward position, in which FIG. 5A is a detailed cross-sectional view thereof, and FIG. 5B is a plan view of an orbital guide.

FIGS. 6A and 6B each are a view illustrating a contact aspect between an accommodating part of the saber saw and a thinnest part of the orbital guide, in which FIG. 6A is a detailed cross-sectional view thereof, and FIG. 6B is a plan view of the orbital guide.

FIGS. 7A and 7B each are a view illustrating the gear part, the plunger and the blade mounting part of the saber saw according to the first embodiment of the present invention in a case where the reciprocating part is in a rearward position, in which FIG. 7A is a detailed cross-sectional view thereof, and FIG. 7B is a plan view of the orbital guide.

FIGS. 8A and 8B each are a view illustrating a contact aspect between the accommodating part of the saber saw and a thickest part of the orbital guide, in which FIG. 8A is a detailed cross-sectional view thereof, and FIG. 8B is a plan view of the orbital guide.

DESCRIPTION OF EMBODIMENTS

Figure 1:
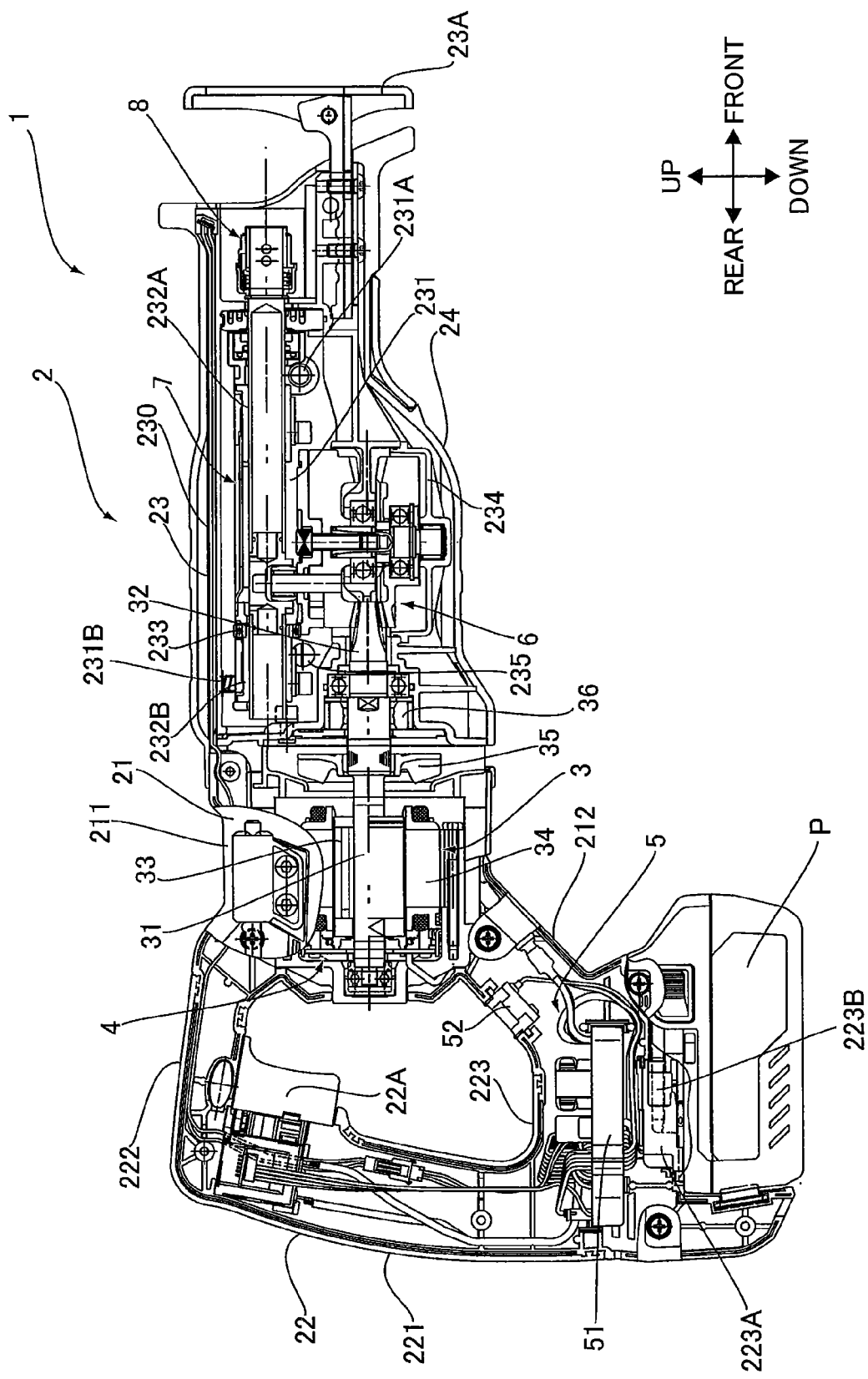
FIG. 1 is a cross-sectional side view illustrating an internal structure of a saber saw according to a first embodiment of the present invention.

A saber saw 1 will be described while referring to FIGS. 1 through 7 as an example of a reciprocating tool according to a first embodiment of the present invention.

In the following description, "top," "bottom," "front," and "rear" shown in FIG. 1 define the upward direction, downward direction, forward direction, and rearward direction, respectively. Further, "right" and "left" when viewing the saber saw 1 from the rear are defined as the rightward direction and leftward direction, respectively. When, dimensions, numerals, and the like are referenced in this specification, the values are intended to include not only dimensions and numerals that match these dimensions, numerals, and the like exactly, but also dimensions, numerals, and the like that approximately match (values within a range of manufacturing error, for example). Similarly, such terms as identical, orthogonal, parallel, matching, flush, constant, and symmetry are intended to include the meanings approximately identical, approximately orthogonal, approximately parallel, approximately matching, approximately flush, approximately constant, and approximately symmetry, respectively.

The saber saw 1 is an electric reciprocating tool for cutting wood and steel materials, pipes, and the like (workpieces). As shown in FIG. 1, the saber saw 1 has a housing 2 in which a battery pack P is detachably mounted, a motor 3, a control board 4, a control unit 5, a gear unit 6, a plunger 7, and a blade mounting part 8 to which a blade Q is attachable.

The housing 2 forms the outer shape of the saber saw 1. The housing 2 has a motor housing 21, a handle housing 22, a gear housing 23, and a front cover 24. The housing 2 is an example of the "housing" in the present invention.

Each of the motor housing 21 and handle housing 22 is configured as a divided housing that is divided along a dividing plane (virtual plane) orthogonal to the left-right direction and passing through the center portion of the housing 2. The divided right-side portion and left-side portion of each housing are symmetrical about the dividing plane.

As shown in FIG. 1, the motor housing 21 has a cylindrical part 211, and an extension part 212.

The cylindrical part 211 has an approximate cylindrical shape that is elongated in the front-rear direction. The cylindrical part 211 accommodates the motor 3 and control board 4.

The extension part 212 forms an approximate cylindrical shape and extends in a downward and rearward direction from the bottom of the rear portion of the cylindrical part 211.

The handle housing 22 has a general square C-shape in a side view. The handle housing 22 is positioned rearward of the motor housing 21. The handle housing 22 has a grip part 221, a first connecting part 222, and a second connecting part 223.

The grip part 221 is the portion that the operator grips when operating the saber saw 1. The grip part 221 extends vertically. A trigger 22A is provided in the upper-front portion of the grip part. The trigger 22A can be manually operated in order to control starting and stopping of the motor 3.

The first connecting part 222 extends forward from the top end of the grip part 221. The front-end portion of the first connecting part 222 is connected with the upper-rear portion of the cylindrical part 211 constituting the motor housing 21.

The second connecting part 223 forms the bottom portion of the handle housing 22 and extends in the front-rear direction. The front end of the second connecting part 223 is connected to the rear end of the extension part 212 constituting the motor housing 21.

A battery connecting part 223A that can connect to the battery pack P is also provided on the bottom of the second connecting part. A battery connecting terminal unit 223B that connects to terminal parts (not shown) on the battery pack P is provided on the battery connecting part 223A.

The gear housing 23 extends forward from the cylindrical part 211 of the motor housing 21. The gear housing 23 accommodates the gear unit 6 and the plunger 7. A base 23A that contacts the workpiece during a cutting operation is provided on the front-end portion of the gear housing 23. The structure of the gear housing 23 will be described later in greater detail.

The front cover 24 has a general cylindrical shape that extends forward from the front end of the motor housing 21 and that narrows in diameter toward the front. The front cover 24 covers substantially the entire outer circumferential surface of the gear housing 23. The front cover 24 is configured of an elastic member with high electric and heat insulating properties, such as a resin having a high coefficient of friction.

The motor 3 is a brushless DC motor. The motor 3 has a rotating shaft 31, a pinion 32, a rotor 33, a stator 34, a fan 35, and an elastic body 36. The motor 3 is an example of the "motor" in the present invention.

The rotating shaft 31 extends in the front-rear direction. The rotating shaft 31 is supported in the housing 2 so as to be capable of rotating about an axis A oriented in the front-rear direction and so as to be capable of moving in the front-rear direction relative to the housing 2. The axis A is a line extending in the left-right direction that passes through the axial center of the rotating shaft 31. The rotating shaft 31 is an example of the "rotating shaft" in the present invention.

The pinion 32 is disposed on the front end of the rotating shaft 31 and is integrally provided with the rotating shaft 31. The pinion 32 rotates together and coaxially with the rotating shaft 31. The pinion 32 is an example of the "pinion" in the present invention.

The rotor 33 has permanent magnets. The rotor 33 is fixed to the rotating shaft 31 so as to rotate together and coaxially with the rotating shaft 31.

The stator 34 has a general cylindrical shape that is elongated in the front-rear direction. The stator 34 has three star-connected stator windings. The stator 34 is accommodated in the cylindrical part 211 of the motor housing 21 so as to be fixed relative to the housing 2.

The elastic body 36 is an elastically deformable rubber member. The elastic body 36 has a general cylindrical shape that is elongated in the front-rear direction. In such cases that the thrust acting on the rotating shaft 31 becomes extremely high, the rotating shaft 31 and members configured integrally with the rotating shaft 31 move rearward in the present embodiment, compressing the elastic body 36 rearward, thereby mitigating the impact on the rotating shaft 31 and gear unit 6. In other words, durability of the rotating shaft 31 and gear unit 6 against impacts can be improved, suppressing damage to and deformation of the rotating shaft 31 and gear unit 6.

The control board 4 has a general annular shape in a front-side view. The control board 4 is disposed to the rear of the motor 3. Provided on the control board 4 are Hall effect devices for detecting the position of the rotating shaft 31 of the motor 3, six FETs for controlling the motor 3, and the like.

The control unit 5 has a control box 51, and a panel 52.

The control box 51 is formed in a general parallelepiped shape. The control box 51 is disposed inside the second connecting part 223 of the handle housing 22. The control box 51 accommodates a control board unit (control unit) that selectively outputs drive signals to the six FETs based on user operations on the trigger 22A and signals outputted from the Hall effect devices 41 to control the rotating direction, speed, and the like of the motor 3. The control board unit is configured of a microcomputer, a drive signal output circuit, and the like, for example.

The panel 52 is embedded in the circumferential wall of the extension part 212 constituting the motor housing 21. The panel 52 is electrically connected to the control box 51. A display unit visible to the operator is provided on an endface of the panel 52 in the extended direction of the same. The operator can perform operations while monitoring the residual battery level indicator, cutting speed indicator, and the like displayed on this display unit.

Next, the structure of the gear housing 23 will be described in greater detail with reference to FIGS. 1 and 2.

Figure 2:
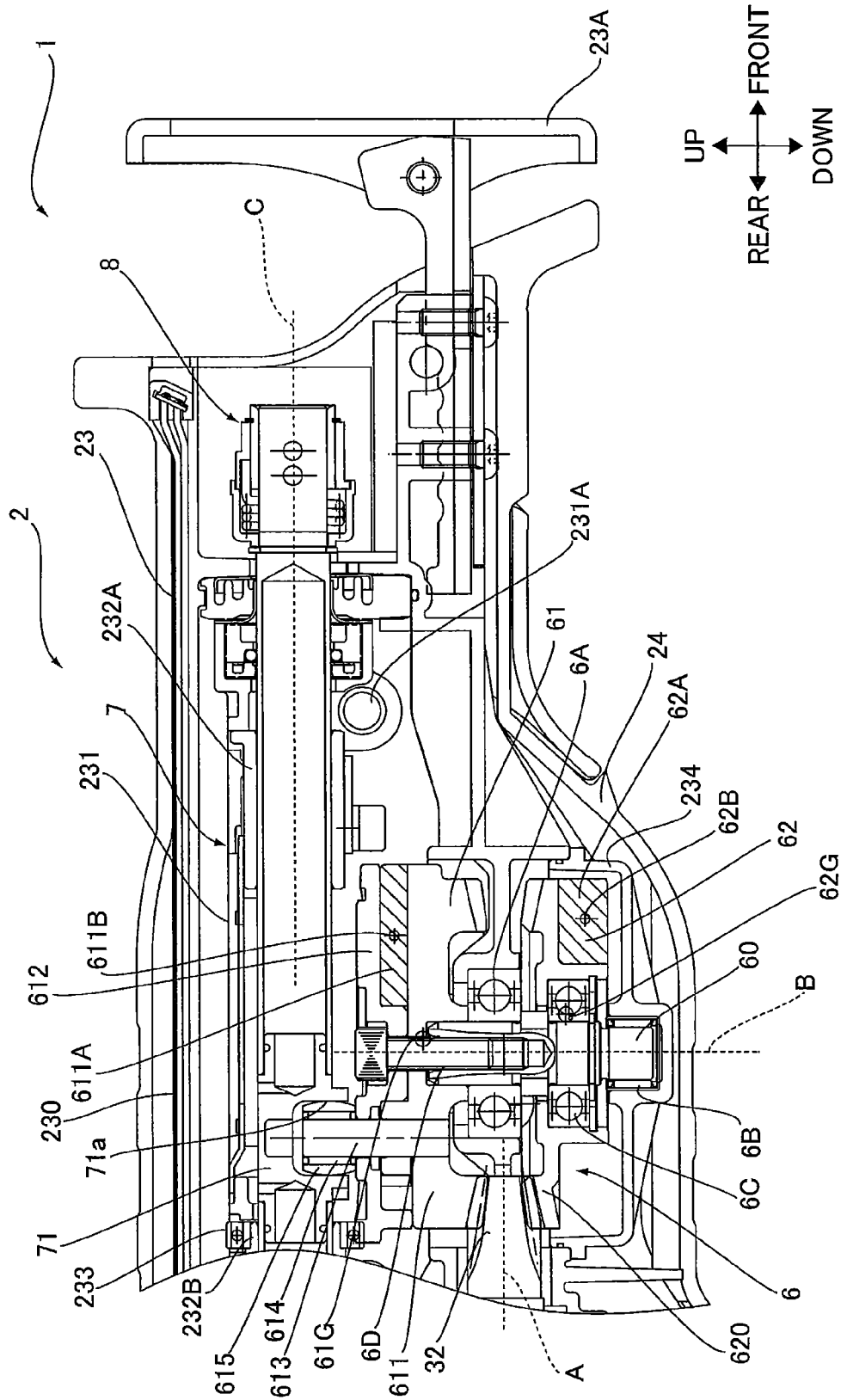
FIG. 2 is a detailed cross-sectional view illustrating a gear part, a plunger and in the vicinity thereof according to the first embodiment of the present invention.

As shown in FIGS. 1 and 2, the gear housing 23 primarily includes a main case 230, a plunger cover 231, a pair of sliding metal members 232A and 232B, a bearing 233, a cover 234, and a switching part 235.

The main case 230 is formed in a general cylindrical shape that is elongated in the front-rear direction. The main case 230 supports components inside the gear housing 23.

The plunger cover 231 is a metal member that extends in the front-rear direction. While not represented in detail in the drawing, the plunger cover 231 has sliding metal member disposing parts formed in the front and rear portions thereof. The sliding metal member disposing parts extend in the front-rear direction and are recessed upward. A pivot shaft 231A is provided in the plunger cover 231.

The pivot shaft 231A is disposed on the bottom of the front portion of the plunger cover 231 and is oriented in the left-right direction. The left-end part and right-end part of the pivot shaft 231A are supported in the main case 230. The plunger cover 231 is configured to be vertically pivotable about the center of the pivot shaft 231A.

As shown in FIG. 1, a spring 213B is also provided between the main case 230 and the plunger cover 231. The spring 213B urges the rear portion of the plunger cover 231 downward.

The sliding metal members 232A and 232B are fixed in the sliding metal member disposal parts formed respectively in the front and rear portions of the plunger cover 231. A through-hole extending in the front-rear direction is formed in each of the sliding metal members 232A and 232B. The plunger 7 is inserted into these through-holes. In this way, the plunger cover 231 supports the plunger 7 so as to be capable of slidingly reciprocating in the front-rear direction via the sliding metal members 232A and 232B.

The bearing 233 is disposed around the sliding metal member 232B. An inner ring part of the bearing 233 is fixed to the outer surface of the sliding metal member 232B, and an outer ring part of the bearing 233 is configured to be rotatable relative to the sliding metal member 232B.

The cover 234 forms the bottom of the gear housing 23. The cover 234 is formed with a general trapezoidal shape in a cross-sectional view and is disposed so as to protrude downward. The cover 234 is arranged to cover the bottom of the gear unit 6 and supports the bottom of the gear unit 6.

The switching part 235 is disposed in the main case 230 so as to be rotatable about a shaft oriented in the left-right direction. The switching part 235 is provided with a general semicircular cross section. The orientation of the switching part 235 can be changed between a pressing position for pressing the plunger cover 231 and sliding metal member 232B upward, and a release position for releasing this pressure. In the present embodiment, the switching part 235 is in the pressing position when the substantially semicircular cross section faces substantially forward, and is in the release position when the substantially semicircular cross section faces substantially upward.

Next, the gear unit 6 will be described with reference to FIGS. 2 through 4.

Figure 3:
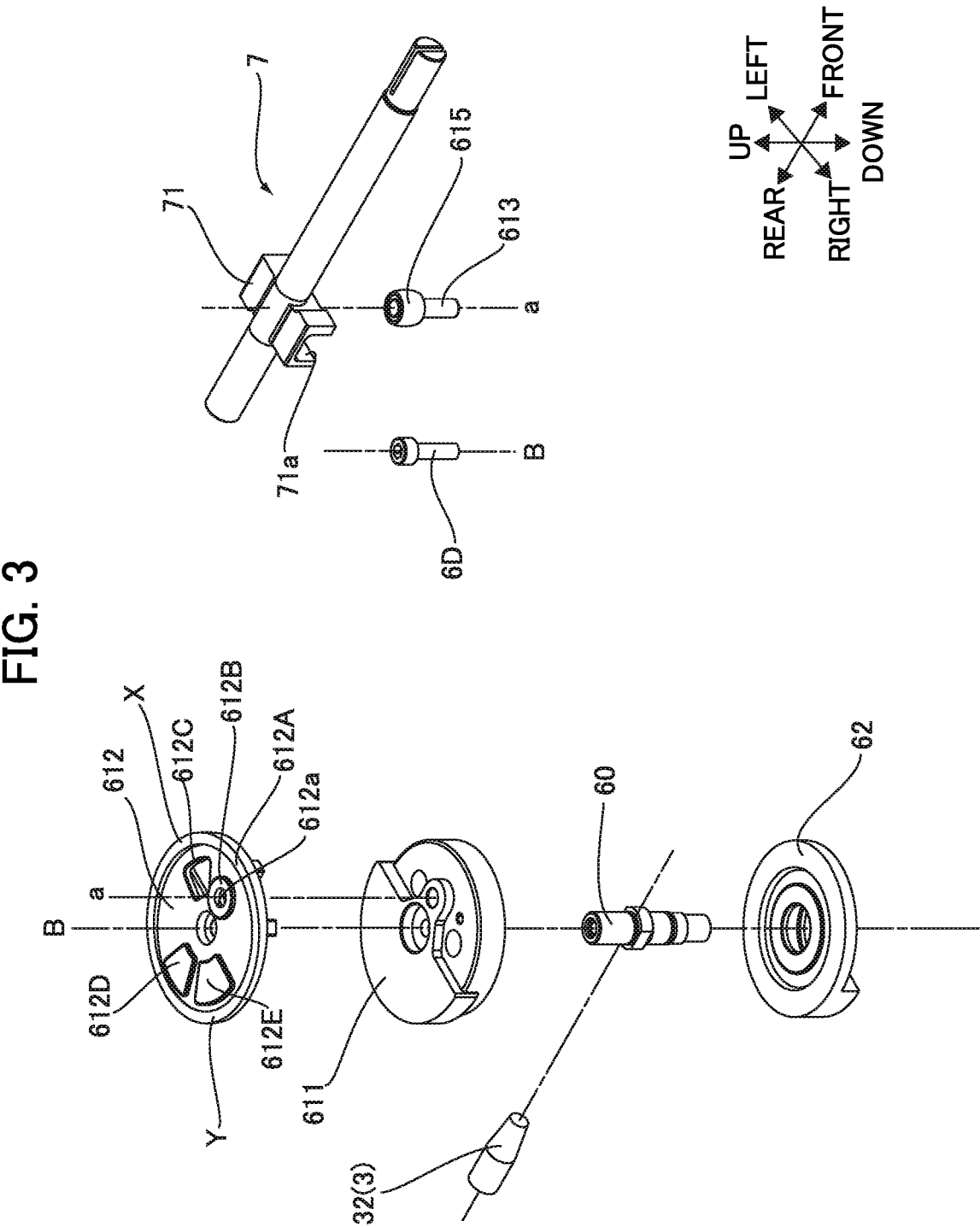
FIG. 3 is an exploded perspective view illustrating the gear part and the plunger of the saber saw according to the first embodiment of the present invention.

As shown in FIGS. 2 and 3, the gear unit 6 has an intermediate shaft 60, a transmission gear part 61, and a counter weight part 62.

The intermediate shaft 60 has a general columnar shape that is elongated vertically. The intermediate shaft 60 is rotatably supported in the gear housing 23 by a large-diameter ball bearing 6A and a small-diameter ball bearing 6B so as to be capable of rotating about an axis B oriented vertically. The axis B is a line that is orthogonal to the rotating shaft 31, extending vertically and passing through the axis of the intermediate shaft 60.

The transmission gear part 61 has a bevel gear 611, an orbital guide 612, a pin 613, a needle bearing 614, and a connecting piece 615. The transmission gear part 61 is an example of the "first rotary body" in the present invention.

The bevel gear 611 has a general circular shape in a plan view and is meshed with the pinion 32 of the motor 3. The bevel gear 611 rotates when receiving the drive force of the motor 3. The bevel gear 611 is fixed to the intermediate shaft 60 by a screw 6D. The bevel gear 611 can rotate together with the intermediate shaft 60 about the axis B. In a plan view, the bevel gear 611 rotates in the counterclockwise direction (see arrows (i) through (iv) in FIGS. 5 through 8). The bevel gear 611 is a gear with teeth cut therein, formed by milling steel. The bevel gear 611 has a weight 611A. The bevel gear 611 is an example of the "first gear part" in the present invention. The axis B is an example of the "axis oriented in a prescribed direction" in the present invention. The counterclockwise direction in a plan view is an example of the "first direction" in the present invention.

The weight 611A is arranged at a position on the bevel gear 611 on the side of the axis B opposite the pin 613. The weight 611A forms one portion of the bevel gear 611 and is integrally formed with the other portions of the bevel gear 611. In other words, the weight 611A is provided on the bevel gear 611 and can rotate integrally with the bevel gear 611. The weight 611A has a larger mass than the combined mass of all portions of the bevel gear 611 excluding the weight 611A. The weight 611A has a center of gravity 611B. The weight 611A is an example of the "first weight part" in the present invention.

The orbital guide 612 is disposed so as to be able to rotate together with the bevel gear 611 about the axis B. As shown in FIG. 3, the orbital guide 612 has a general circular shape centered on the axis B with an outer diameter substantially equivalent to that of the bevel gear 611. The orbital guide 612 has a rail 612A, a pin insertion part 612B, a thinned part 612C, a first thickened part 612D, and a second thickened part 612E. The orbital guide 612 is an example of the "rotary member" in the present invention.

The rail 612A is formed in an annular shape along the outer edge portion of the orbital guide 612. The upper edge of the rail 612A is formed as if cut along a plane extending in a direction that obliquely intersects the intermediate shaft 60. In other words, the upper edge of the rail 612A is formed so as to slope relative to a virtual plane extending parallel to the left-right and front-rear directions. That is, the rail 612A is formed such that its vertical thickness varies along the circumferential direction. In the following description, the thickest portion of the rail 612A in the vertical direction will be called the thickest part X, and the thinnest portion will be called the thinnest part Y (see FIG. 3).

The top edge of the rail 612A is also configured to be capable of contacting the bearing 233 of the gear housing 23. Specifically, when the switching part 235 is in the release position, the top edge of the rail 612A contacts the bearing 233 and supports the rear portion of the plunger cover 231 through the bearing 233. When the bevel gear 611 rotates, the main case 230 follows the shape of the rail 612A while rotating and reciprocates vertically according to the height of the rail 612A. Through this vertical reciprocation of the bearing 233, the plunger cover 231 of the gear housing 23 pivots vertically about the axis of the pivot shaft 231A. Further, since the spring 213B disposed between the main case 230 and plunger cover 231 urges the rear portion of the plunger cover 231 downward, the bearing 233 can suitably contact the top surface of the rail 612A causing the blade Q attached to the output part to move with a suitable orbital motion when the switching part 235 is in the release position.

Further, the top edge of the rail 612A separates from the bearing 233 when the switching part 235 is in the pressing position. Accordingly, the bearing 233 is maintained in a fixed vertical position, even as the gear unit 6 rotates.

The pin insertion part 612B is positioned inside of the rail 612A in a radial direction of the orbital guide 612. The pin insertion part 612B is disposed at a position along the circumferential direction of the rail 612A offset approximately 60 degrees from the thickest part X of the rail 612A. A pin insertion hole 612a extending vertically is formed in the pin insertion part 612B. The portion of the pin insertion part 612B around the pin insertion hole 612a is raised upward from the top surface of the orbital guide 612. Raising the portion surrounding the pin insertion hole 612a in this way in the present embodiment prevents the center of gravity of the orbital guide 612 (standalone part) from changing (moving) due to the formation of the pin insertion hole 612*a*.

The thinned part 612C is positioned inside of the rail 612A in a radial direction of the orbital guide 612. The thinned part 612C is die-cut to form a substantial trapezoidal shape in a plan view. The thinned part 612C is disposed at substantially the same position along the circumferential direction of the rail 612A as the thickest part X of the rail 612A.

The first thickened part 612D is positioned inside of the rail 612A in a radial direction of the orbital guide 612. The first thickened part 612D is disposed at a position along the circumferential direction of the rail 612A that is offset approximately 60 degrees from the thinnest part Y of the rail 612A and is symmetric to the pin insertion part 612B relative to the axis B.

The second thickened part 612E is positioned inside of the rail 612A in a radial direction of the orbital guide 612. The second thickened part 612E is disposed at substantially the same position along the circumferential direction of the rail 612A as the thinnest part Y of the rail 612A and is symmetric to the thinned part 612C relative to the axis B.

Since the rail 612A is formed with a thickness that varies along the circumferential direction of the same, the center of gravity of the orbital guide (standalone part) will be located on the thickest part X side with respect to the axis B (the side opposite the thinnest part with respect to the axis B) if the thickness of the portion of the orbital guide 612 radially inside the rail 612A is not increased or decreased. However, by providing the thinned part 612C, first thickened part 612D, and second thickened part 612E in the present embodiment, the center of gravity of the orbital guide 612 (standalone part) is configured to be located on the axis B. Configuring the center of gravity of the orbital guide 612 to be located on the axis B in this way can suppress vibrations generated in the saber saw 1. Further, designing the center of gravity of the orbital guide 612 to be located on the axis B enables a structure for reducing vibrations to be achieved through the simple method of merely finely adjusting the mass of each weight and the like on the transmission gear part 61 and the counter weight part 62.

The pin 613 has a general columnar shape that is elongated vertically. The pin 613 is fixed by press-fitting the bottom portion in the bevel gear 611 at an eccentric position to the axis B. The upper portion of the pin 613 protrudes in a direction along the axis B from the top surface of the bevel gear 611 through the pin insertion hole 612*a* formed in the pin insertion part 612B of the orbital guide 612. The pin 613 is an example of the "protruding part" in the present invention.

The needle bearing 614 is disposed on the top portion of the pin 613. That is, the needle bearing 614 is provided on the protruding end of the pin 613. The needle bearing 614 can rotate relative to the pin 613.

The connecting piece 615 is formed in a general cylindrical shape that is elongated vertically. The needle bearing 614 is rotatably disposed on the inner circumferential surface of the connecting piece 615, whereby the connecting piece 615 can rotate relative to the pin 613. The needle bearing 614 and the connecting piece 615 are an example of the "connecting part" of the present invention.

The counter weight part 62 is disposed beneath the bevel gear 611 so as to vertically oppose the bevel gear 611 across the axis A for the rotating shaft 31 of the motor 3. The counter weight part 62 has a bevel gear 620, and a weight 62A (shaded area). The counter weight part 62 is an example of the "second rotary body" in the present invention.

The rear side of the bevel gear 620 is meshed with the pinion 32. The bevel gear 620 is configured to be rotatable about the axis B relative to the intermediate shaft 60 via a ball bearing 6C. The bevel gear 620 rotates in the clockwise direction in a plan view. The number of teeth possessed by the bevel gear 620 is equivalent to the number of teeth possessed by the bevel gear 611. The counterclockwise direction in a plan view is an example of the "second direction" in the present invention. The bevel gear 620 is an example of the "second gear part" in the present invention.

The weight 62A constitutes a portion of the counter weight part 62 that is integrally formed with the other portions of the counter weight part 62. The weight 62A has a greater mass than the combined mass of all portions of the counter weight part 62 other than the weight 62A. The weight 62A has a center of gravity 62B.

Here, the relationship between a center of gravity 61G of the transmission gear part 61 and a center of gravity 62G of the counter weight part 62 will be described with reference to FIG. 4.

Figure 4:
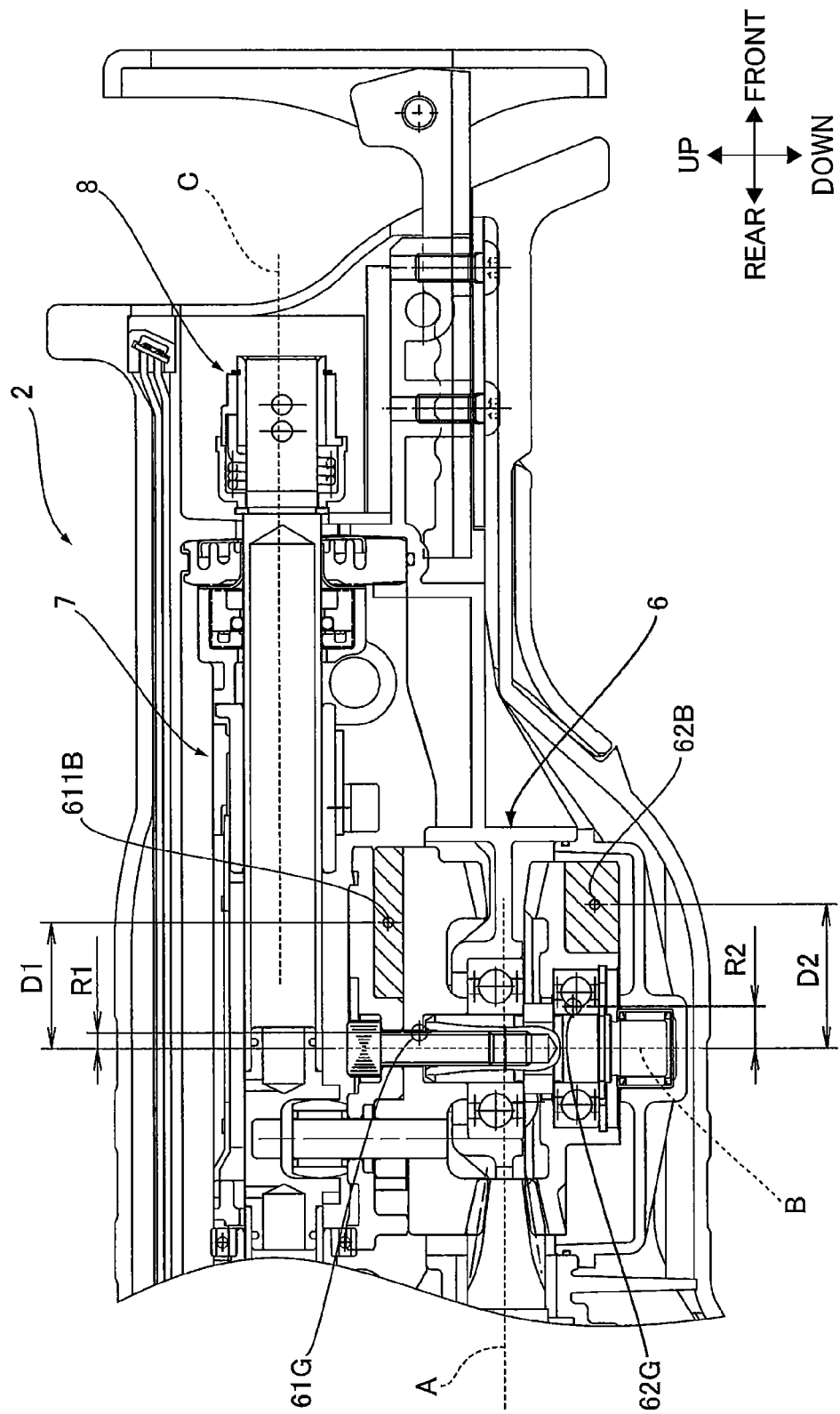
FIG. 4 is a detailed cross-sectional view illustrating a positional relationship of a center of gravity of a transmission gear part and a center of gravity of a counter weight part according to the first embodiment of the present invention.

As shown in FIG. 4, the center of gravity 61G of the transmission gear part 61, and specifically the assembled body of the bevel gear 611 (including the weight 611A), the orbital guide 612, the pin 613, the needle bearing 614, and the connecting piece 615 that rotate integrally in the counterclockwise direction in a plan view, is located in a position offset by a distance R1 from the axis B along a radial direction of the intermediate shaft 60. The center of gravity 611B of the weight 611A (standalone part) is located in a position offset by a distance D1 from the axis B along a radial direction of the intermediate shaft 60. The R1 and D1 are at different positions.

Further, the center of gravity 62G of the counter weight part 62, and specifically the assembled body of the weight 62A and the bevel bear 620 that rotate integrally in the clockwise direction in a plan view is located in a position offset by a distance R2 from the axis B in a radial direction of the intermediate shaft 60. The center of gravity 62B of the weight 62A (standalone part) is located in a position offset by a distance D2 from the axis B along a radial direction of the intermediate shaft 60. The R2 and D2 are at different positions.

In the present embodiment, D1 and D2 are set different from each other; that is, the radial distance from the axis B to the weight 611A provided in the bevel gear 611 is set different from the radial distance from the axis B to the weight 62A of the counter weight part 62 in order to make the distance R1 different from the distance R2. In particular, the center of gravity 61G is configured to be positioned closer than the center of gravity 62G to the axis B. In other words, the distance between the center of gravity 61G and the axis B in a direction orthogonal to the axis B (front-rear direction) is shorter than the distance between the center of gravity 62G and the axis B. Further, the distance from the center of gravity 61G to the axis A along the direction of the axis B (vertical direction) is greater than the distance from the center of gravity 62G to the axis A. That is, the vertical distance between the center of gravity 61G and the axis A is longer than the vertical distance between the center of gravity 62G and the axis A. Further, the distance from the axis A to the weight 611A provided in the bevel gear 611 in a direction along the axis B differs from the distance from the axis A to the weight 62A of the counter weight part 62 in a direction along the axis B. These factors also affect the positional setting for each center of gravity.

The following relationship between the transmission gear part 61 and the counter weight part 62 is also satisfied: G1×R1=G2×R2. Here, G1 is the combined mass of the bodies constituting the transmission gear part 61, and R1 is the distance from the axis B to the center of gravity 61G, as described above. Further, G2 is the combined mass of the bodies constituting the counter weight part 62, and R2 is the distance from the axis B to the center of gravity 62G, as described above. Hence, the product of the distance R1 from the axis B to the center of gravity 61G and the combined mass of the bodies constituting the transmission gear part 61 is configured to be equivalent to the product of the distance R2 from the axis B to the center of gravity 62G and the combined mass of the bodies constituting the counter weight part 62. With this configuration, the magnitude of centrifugal force generated in the transmission gear part 61 can be made equivalent to the magnitude of centrifugal force generated in the counter weight part 62 when the transmission gear part 61 and counter weight part 62 rotate in opposite directions at the same angular velocity.

Next, the plunger 7 and blade mounting part 8 will be described with reference to FIGS. 1 through 4.

The plunger 7 is interposed between the bevel gear 611 and the blade mounting part 8 along the transmission path for the drive force of the motor 3 and converts the rotational motion of the bevel gear 611 to reciprocating motion of the blade mounting part 8. The plunger 7 extends in the front-rear direction and is supported via the pair of sliding metal members 232A and 232B disposed respectively in the front and rear portions of the plunger cover 231 so as to be capable of moving in the front-rear direction relative to the plunger cover 231. The plunger 7 is also capable of pivoting up and down as the plunger cover 231 pivots about the pivot shaft 231A. A pin guide 71 is provided on the plunger 7. The plunger 7 moves in the front-rear direction together with the pin guide 71 along an axis C. The axis C is a line passing through the axial center of the plunger. The plunger 7 is an example of the "motion converting part" in the present invention.

The pin guide 71 is positioned at an intermediate part of the plunger 7 along the front-rear direction. A guide groove 71a is formed in the bottom of the pin guide 71. The guide groove 71a is recessed upward and elongated in the left-right direction. The guide groove 71a is formed with a slightly larger width in the front-rear direction than the diameter of the pin 613. The connecting piece 615 is connected to the guide groove 71a. The top portion of the pin 613 is accommodated in the guide groove 71a and capable of moving in the left-right direction together with the needle bearing 614 and connecting piece 615. That is, the pin 613 is allowed to move along the left-right direction while being restricted from moving in the front-rear direction relative to the pin guide 71. More specifically, the pin 613, needle bearing 614, and connecting piece 615 move in left and right directions through the guide groove 71a as the connecting piece 615 rotates relative to the top portion of the pin 613. The pin guide 71 can also move vertically relative to the pin 613.

The blade mounting part 8 is disposed on the front end of the plunger 7 and is configured such that the blade Q for cutting material can be mounted therein. The blade mounting part 8 is supported in the housing 2 so as to be capable of reciprocating along the axis C. The blade mounting part 8 is an example of the "output part" in the present invention.

Figure 5:
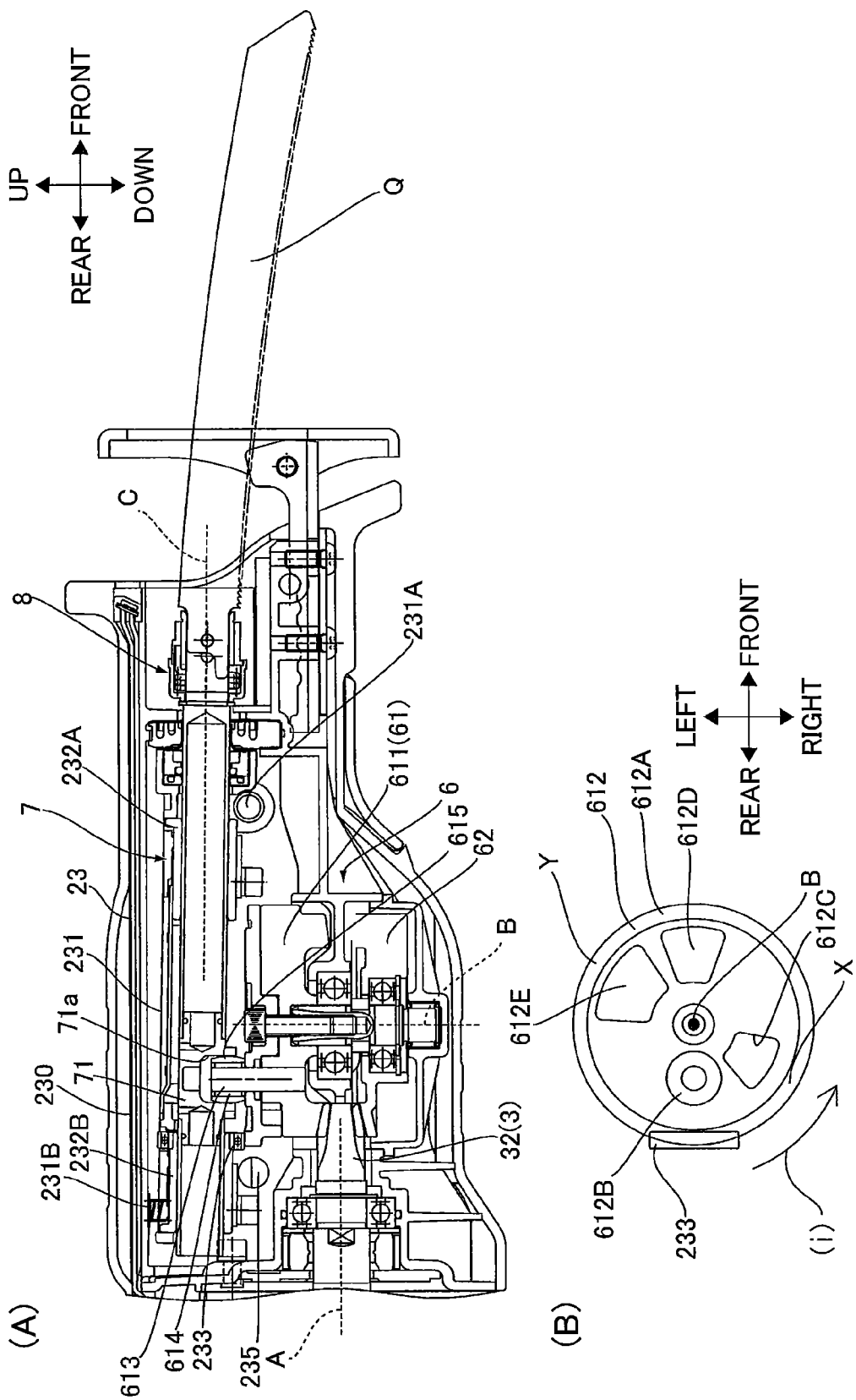

Next, a cutting operation on a workpiece (a metal pipe, for example) using the saber saw 1 according to the present embodiment and the operations of the saber saw 1 during the cutting operation when the switching part 235 is in the release position will be described with reference to FIGS. 5 through 9. Note that the state in which the pin insertion part 612B of the orbital guide 612 is positioned on the approximate rear side of the axis B, as illustrated in FIG. 5(b), will be used as a reference (a phase angle of 0 degree) in the following description.

Figure 7:
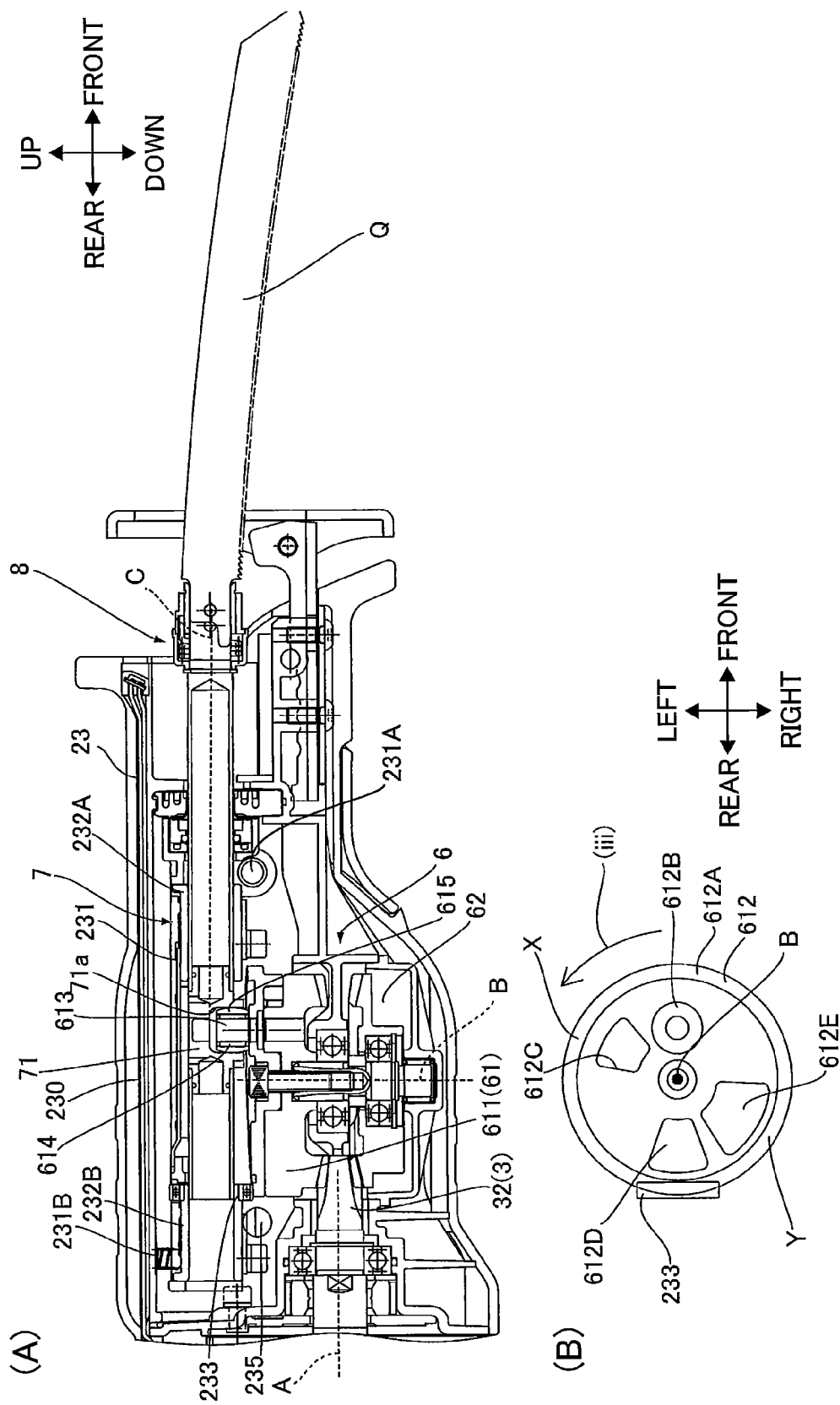

When performing a cutting operation, the operator mounts the blade Q in the blade mounting part 8 and pushes the base 23A against the workpiece. When the operator pulls the trigger 22A in this state, the control unit accommodated in the control box 51 controls the six FETs in order to supply power from the battery pack P to the motor 3 to begin driving the motor 3. When the motor 3 begins driving, the rotating shaft 31 and pinion 32 rotate and the bevel gear 611 meshed with the pinion 32 begins rotating about the axis B oriented vertically. Through this rotation of the bevel gear 611, the pin 613 circulates about the axis B. Only the front-rear directional component of this circulating motion of the pin 613 is transmitted to the pin guide 71, causing the plunger 7, pin guide 71, blade mounting part 8, and blade Q mounted in the blade mounting part 8 to reciprocate together in the front-rear direction between a state in which each component is in its forwardmost position (called the forward position in the following description; FIG. 7) and a state in which each component is in their rearwardmost position (called the rearward position in the following description; FIG. 5). In the following description, the plunger 7, pin guide 71, blade mounting part 8, and blade Q will be treated as an integral unit called a "reciprocating part." The forward position is an example of the "first position" in the present invention, and the rearward position is an example of the "second position" in the present invention.

At the same time, the bevel gear 611 is driven by the pinion 32 with which it is meshed. Since the bevel gear 611 and the counter weight part 62 have an equivalent number of teeth, the counter weight part 62 rotates in the opposite direction but at the same magnitude of angular velocity as the bevel gear 611. Along with the respective rotations of the bevel gear 611 and the counter weight part 62, the center of gravity 61G for the assembled body of the transmission gear part 61 and the center of gravity 62G for the assembled body of the counter weight part 62 move in a circular motion about the axis B, rotating in opposite directions from each other about the axis B but at the same magnitude of angular velocity.

Further, the outer ring portion of the bearing 233 rotates while in contact with the top edge of the rail 612A and reciprocates up and down in conformance with the shape of the rail 612A. Through this vertical reciprocation of the bearing 233, the plunger cover 231 of the gear housing 23 and the plunger 7 pivot up and down about the axial center of the pivot shaft 231A. Accordingly, while cutting the workpiece in a cutting operation, the blade Q moves in an elliptical motion, known as an orbital motion, in left-side and right-side views. This action enables the blade Q to more quickly and forcefully cut into the workpiece while moving rearward, thereby improving work efficiency.

More specifically, the orbital guide 612 rotates in the direction of arrow (i), as illustrated in FIG. 5(b), so that the thickest part X of the rail 612A separates from the bearing 233 and the thinnest part Y of the rail 612A moves into proximity of the bearing 233. In this state, the plunger 7 and plunger cover 231 rotate in the counterclockwise direction of FIG. 5(a) about the pivot shaft 231A. As indicated by arrow (i) in FIG. 9, an arbitrary fixed point on the blade Q mounted in the blade mounting part 8 moves upward as the orbital guide 612 rotates. In other words, the blade Q pivots upward.

Figure 9:
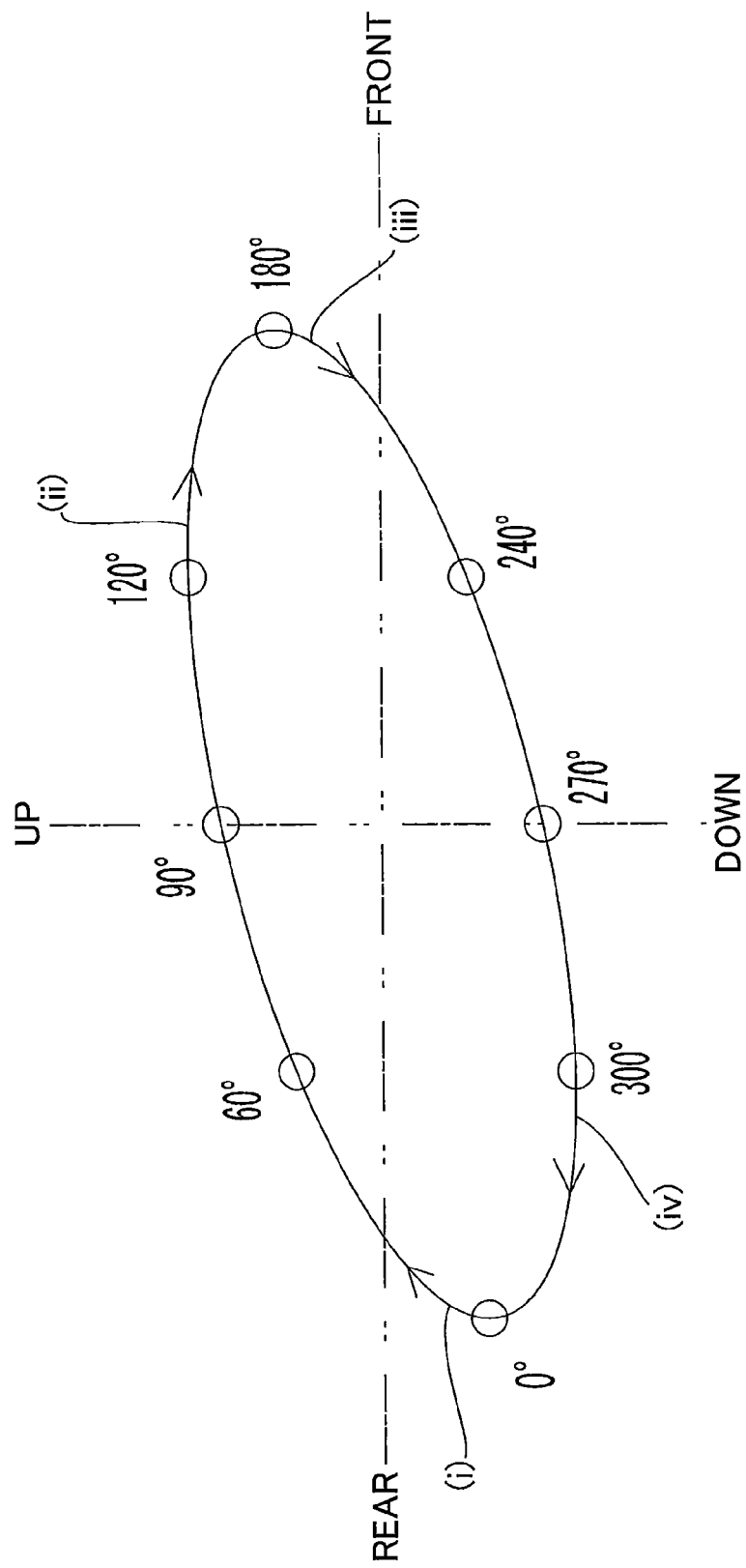
FIG. 9 illustrates a trajectory of a fixed point of a blade when the orbital guide of the saber saw according to the first embodiment of the present invention rotates.

When the orbital guide 612 has rotated 120 degrees from the state shown in FIG. 5(b) serving as reference (the phase angle of 0 degree), the bearing 233 contacts the thinnest part Y of the rail 612A, as shown in FIG. 6(b). In this state, an arbitrary fixed point on the blade Q will be at its top dead center (highest position), as illustrated in FIG. 9. From this state, the orbital guide 612 rotates in the direction of arrow (ii), as illustrated in FIG. 6(b), so that the thinnest part Y of the rail 612A separates from the bearing 233 and the thickest part X of the rail 612A approaches the bearing 233. In this state, the plunger 7 and the plunger cover 231 begin rotating in the clockwise direction of FIG. 6(a) about the pivot shaft 231A. As indicated by arrow (ii) in FIG. 9, an arbitrary fixed point on the blade Q mounted in the blade mounting part 8 begins moving downward as the orbital guide 612 rotates. In other words, the blade Q pivots downward.

Figure 6:
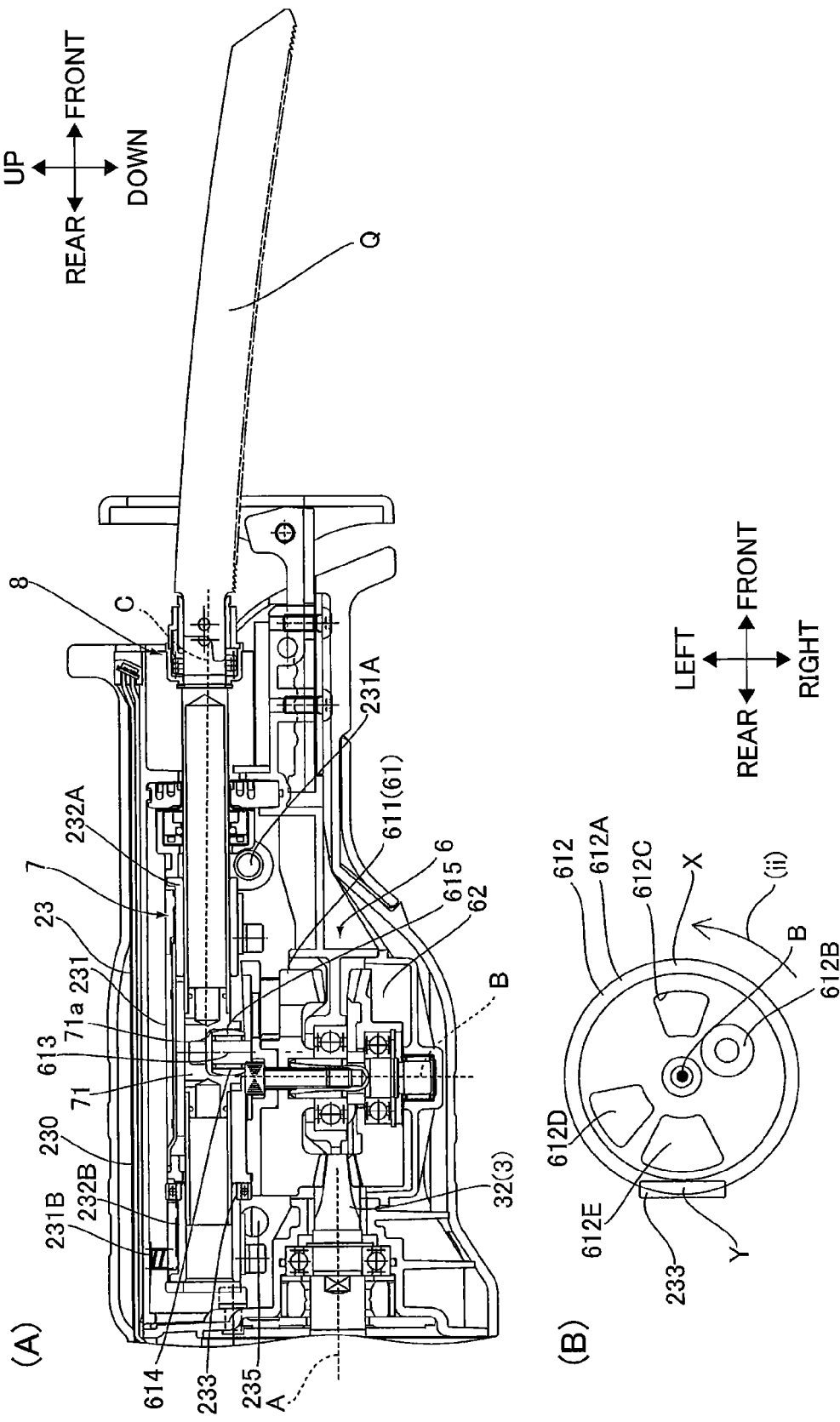

Once the orbital guide 612 has rotated 60 degrees from the state shown in FIG. 6, the orbital guide 612 reaches a state in which the pin 613 is positioned approximately on the front side of the axis B and the reciprocating part is in the forward position (see FIG. 7(b)). When the orbital guide 612 rotates further from this state, the reciprocating part moves rearward as the pin 613 moves rearward. Further, since the orbital guide 612 rotates in the direction of arrow (iii) so that the thinnest part Y of the rail 612A separates from the bearing 233 and the thickest part X of the rail 612A approaches the bearing 233, the plunger 7 and the plunger cover 231 continue pivoting in the clockwise direction about the pivot shaft 231A. At this time, an arbitrary fixed point on the blade Q mounted in the blade mounting part 8 moves downward and rearward, as indicated by arrow (iii) in FIG. 9. In other words, the blade Q moves rearward while pivoting in the clockwise direction. At this time, the blade Q forcefully cuts into the workpiece, improving work efficiency.

After the orbital guide 612 has rotated 120 degrees from the state shown in FIG. 7, the bearing 233 contacts the thickest part X of the rail 612A, as illustrated in FIG. 8(b). In this state, an arbitrary fixed point on the blade Q is in the bottom dead center (lowest position), as shown in FIG. 9. From this state, the orbital guide 612 rotates in the direction of arrow (iv), as illustrated in FIG. 8(b), so that the thickest part X of the rail 612A separates from the bearing 233 and the thinnest part Y of the rail 612A approaches the bearing 233. In this state, the plunger 7 and the plunger cover 231 begin rotating in the counterclockwise direction of FIG. 8(a) about the pivot shaft 231A. Further, an arbitrary fixed point on the blade Q mounted in the blade mounting part 8 begins moving upward as the orbital guide 612 rotates, as indicated by arrow (iv) in FIG. 9. In other words, the blade Q pivots upward.

Next, the effects of the invention will be described in detail while referring to FIG. 10.

Figure 10:
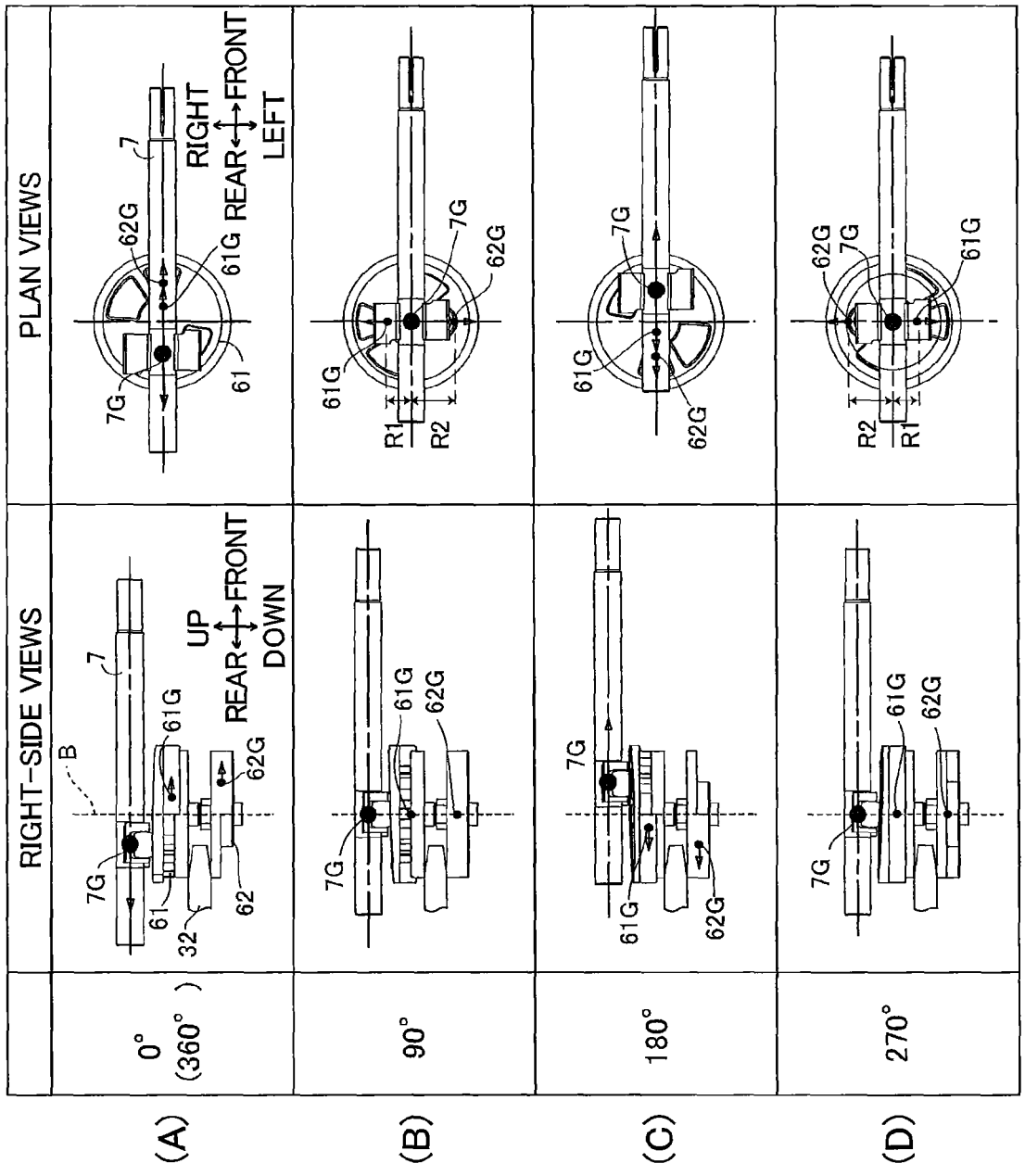
FIGS. 10A through 10D illustrates a positional relationship between the center of gravity of the weight and the center of gravity of reciprocating part of the saber saw according to the first embodiment of the present invention, illustrating circulating states over time of the center of gravity of the weight in a sequence of 90 degrees intervals, in which each figure in the right column is a plan view, and each figure in the left column is a right-side view.
Figure 11:
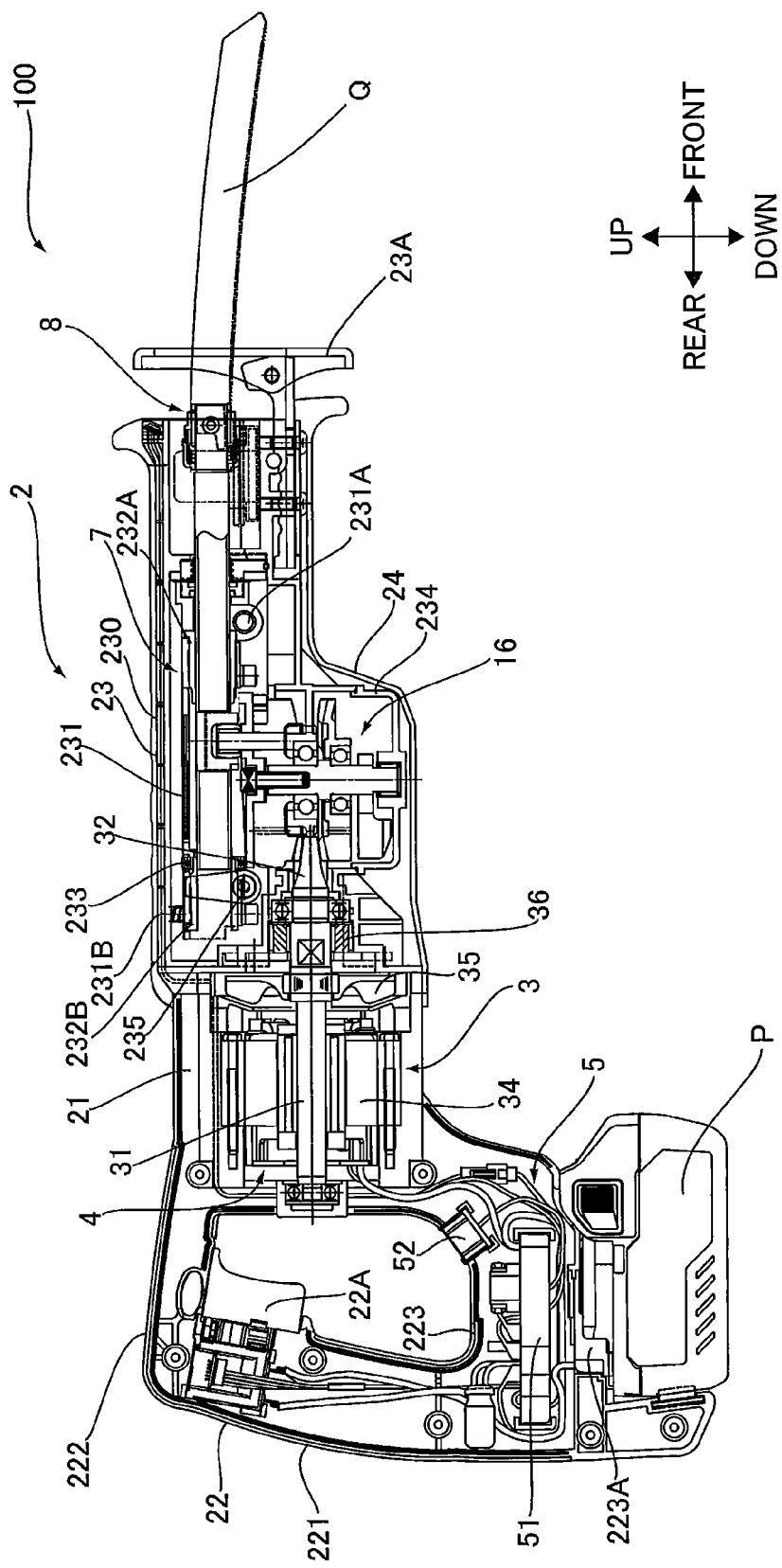
FIG. 11 is a cross-sectional side view illustrating an internal structure of a saber saw according to a second embodiment of the present invention.

FIG. 10 shows the positional relationship between the center of gravity 61G for the assembled body of the transmission gear part 61 and the center of gravity 62G for the assembled body of the counter weight part 62 in plan views and right-side views. FIGS. 10(a) through 10(d) shows the circulating states over time of the center of gravity 61G and center of gravity 62G in a sequence of 90 degrees intervals. FIG. 10(a) shows the state in which the plunger 7 is in the rearward position. FIG. 10(c) shows the state in which the plunger 7 is in the forward position. FIGS. 10(b) and 10(d) show intermediate states of the plunger 7 between the forward position and rearward position.

A center of gravity 7G in FIG. 10 denotes the center of gravity of the plunger 7. The right column in FIG. 10 shows positional relationships of the center of gravity 61G, center of gravity 62G, and center of gravity 7G in plan views, while the left column in FIG. 10 shows positional relationships of the center of gravity 61G, center of gravity 62G, and center of gravity 7G in right-side views. In each drawing, bold arrows indicate the trajectory of the center of gravity 61G and center of gravity 62G and the direction and magnitude of inertial force or centrifugal force generated at each center of gravity.

When the plunger 7 is in the forward position shown in FIG. 10(c), the center of gravity 61G and center of gravity 62G are positioned in the rearmost part of their rotational orbits. When the plunger 7 is in the rearward position shown in FIG. 10(a), the center of gravity 61G and center of gravity 62G are positioned in the forwardmost part of their rotational orbits.

Hence, when the pin guide 71, plunger 7, blade mounting part 8, and blade Q mounted in the blade mounting part 8 are in their forward positions or their rearward positions, the center of gravity 61G and center of gravity 62G are positioned on the opposite side of the axis B from the center of gravity 7G. In other words, the center of gravity 61G and center of gravity 62G are separated farthest from the blade mounting part 8 when the blade mounting part 8 is in the forward position and are closest to the blade mounting part 8 when the blade mounting part 8 is in the rearward position. This configuration can suppress vibrations in the reciprocating direction generated in the body of the saber saw 1 by the reciprocating motion of the blade mounting part 8 (the reciprocating part).

In a right-side view, the direction in which the center of gravity 61G and center of gravity 62G move is opposite the moving direction of the pin guide 71, plunger 7, blade mounting part 8, and blade Q. In other words, the moving direction of the center of gravity 61G and center of gravity 62G is opposite the moving direction of the center of gravity 7G of the plunger 7 in a right-side view, as indicated in the left side of FIGS. 10(a) through 10(d). Therefore, the front-rear directional component of inertia, i.e., centrifugal force, generated in the center of gravity 61G and center of gravity 62G is in the direction opposite that of the inertial force generated by reciprocating motion of the plunger 7. With this configuration, it is possible to suppress vibrations in the reciprocating directions generated in the housing 2.

While the present embodiment is configured to reduce vibrations in the reciprocating direction arising from the center of gravity 7G of the plunger 7 in the reciprocating part, the front-rear directional component of centrifugal force generated in the center of gravity 61G and the center of gravity 62G is directed opposite the inertial force generated by reciprocating motion of the reciprocating part. Accordingly, it is preferable that the masses of the plunger 7, pin guide 71, blade mounting part 8, and blade Q constituting the reciprocating part be configured so that the sum of inertial force generated by these masses is equivalent to the sum of the front-rear directional component of centrifugal force produced in the center of gravity 61G and center of gravity 62G.

As indicated by the bold arrows in FIGS. 10(b) and 10(d), the centrifugal forces generated in the center of gravity 61G and center of gravity 62G have components in the left-right direction that are equivalent in magnitude and opposite in direction, thereby reducing or preventing vibrations in the left-right direction that are generated in the housing 2.

As described above, the transmission gear part 61 and counter weight part 62 are two rotary bodies rotating in opposite directions that not only can prevent or suppress vibrations from reciprocating motion, but also can prevent or suppress vibrations in left and right directions in the saber saw 1. Further, since the distance between the axis B and the center of gravity 61G can be set differently from the distance between the axis B and the center of gravity 62G, the shape and arrangement of the bevel gear 611 can be freely designed to conform to the shape of the housing 2. Dividing the counterweight among two weights, i.e., the weight 611A and the weight 62A, further enhances design freedom and enables the bevel gear 611 and weight 611A to be reduced in size.

The counter weight part 62 is also separated farther than the bevel gear 611 from the plunger 7 and blade mounting part 8 in a direction along the axis B. With this configuration, the outer shape of the housing 2 can be reduced in size since the relatively simple counter weight part 62 not connected to the plunger 7 or blade mounting part 8 is disposed outside the entire drive force transmitting mechanism.

The counter weight part 62 need not be provided with a function that transmits load to other members, as described above, but may be a member with inferior strength to material formed by die-cutting, and consequently can be manufactured at a cheaper cost. The counter weight part 62 has numerous fine holes through which lubricant can pass. Accordingly, when the counter weight part 62 is driven, the centrifugal force of the counter weight part 62 moves and supplies lubricant to the parts of the gear unit 6. Further, the rectangular shape of the cover 234 functions to guide lubricant upward when the lubricant seeps out of the counter weight part 62 and scatters forward, rearward, leftward, and rightward. Supplying lubricant in this way can prolong the life of the entire internal mechanism of the saber saw 1 and contribute to smooth driving.

In the present embodiment, a drive force can be transmitted directly from the pinion 32 to the bevel gear 611 and counter weight part 62 without passing through other members. The present embodiment enables a lightweight and compact design with an efficient layout for directly transmitting the drive force to the two gears.

The guide groove 71a converts the circular motion of the pin 613 to reciprocating motion. In this way, a simple construction can convert the direction of motion and transmit the drive force in the saber saw 1.

In the present embodiment, the blade Q can efficiently cut a workpiece through orbital motion. In particular, the centrifugal force generated in the center of gravity 61G and center of gravity 62G is directed rearward as the blade Q moves from the forward position to the rearward position, whereby the saber saw 1 is rotated in left-side and right-side views (the saber saw 1 is rotated in the clockwise direction in FIG. 1), producing a moment that moves the blade Q downward. As a result, the blade Q can efficiently cut into the workpiece.

This completes a description of the invention according to the first embodiment. However, this embodiment is merely one example, and it would be apparent to those skilled in the art that many modifications and variations to the combination of components and the like may be made therein without departing from the spirit of the invention.

In the present embodiment, each of the weight 611A and weight 62A is configured to circulate around the axis B. However, the weights are not limited to this configuration, provided that each weight has a center of gravity offset from the axis B and is configured to revolve or rotate about the axis B.

Next, a saber saw 100 will be described with reference to FIGS. 11 through 18. The saber saw 100 is an example of the reciprocating tool according to a second embodiment of the invention. The saber saw 100 has the same basic structure as the saber saw 1 according to the first embodiment. The following description assigns the same reference numerals to identical structures in the saber saw 1, while omitting a description of these structures when appropriate, and focuses primarily on different structures and structures requiring a more detailed description.

Figure 8:
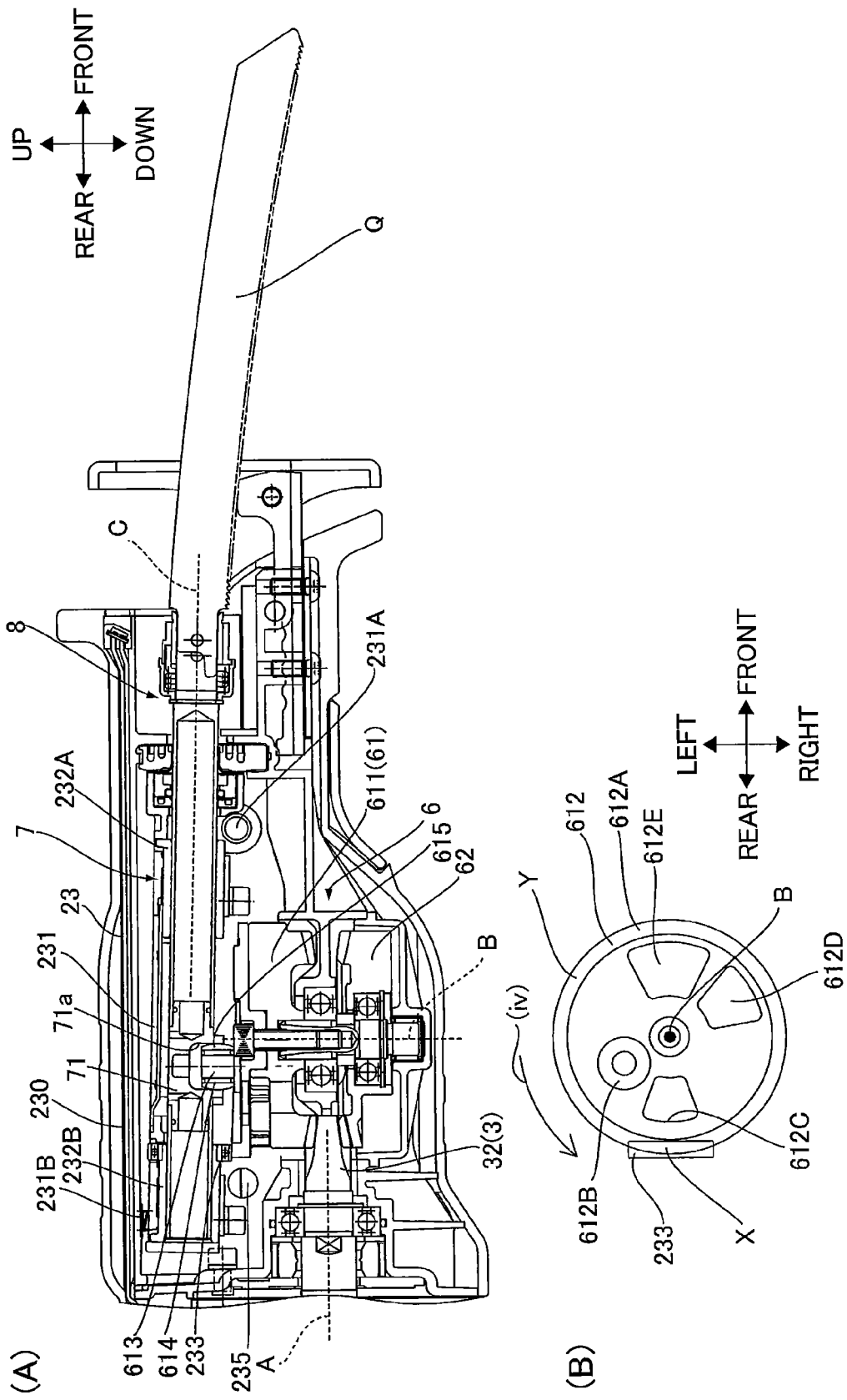

As shown in FIG. 8, the saber saw 100 as an example of the reciprocating tool according to the second embodiment of the invention has a gear part 16.

Figure 12:
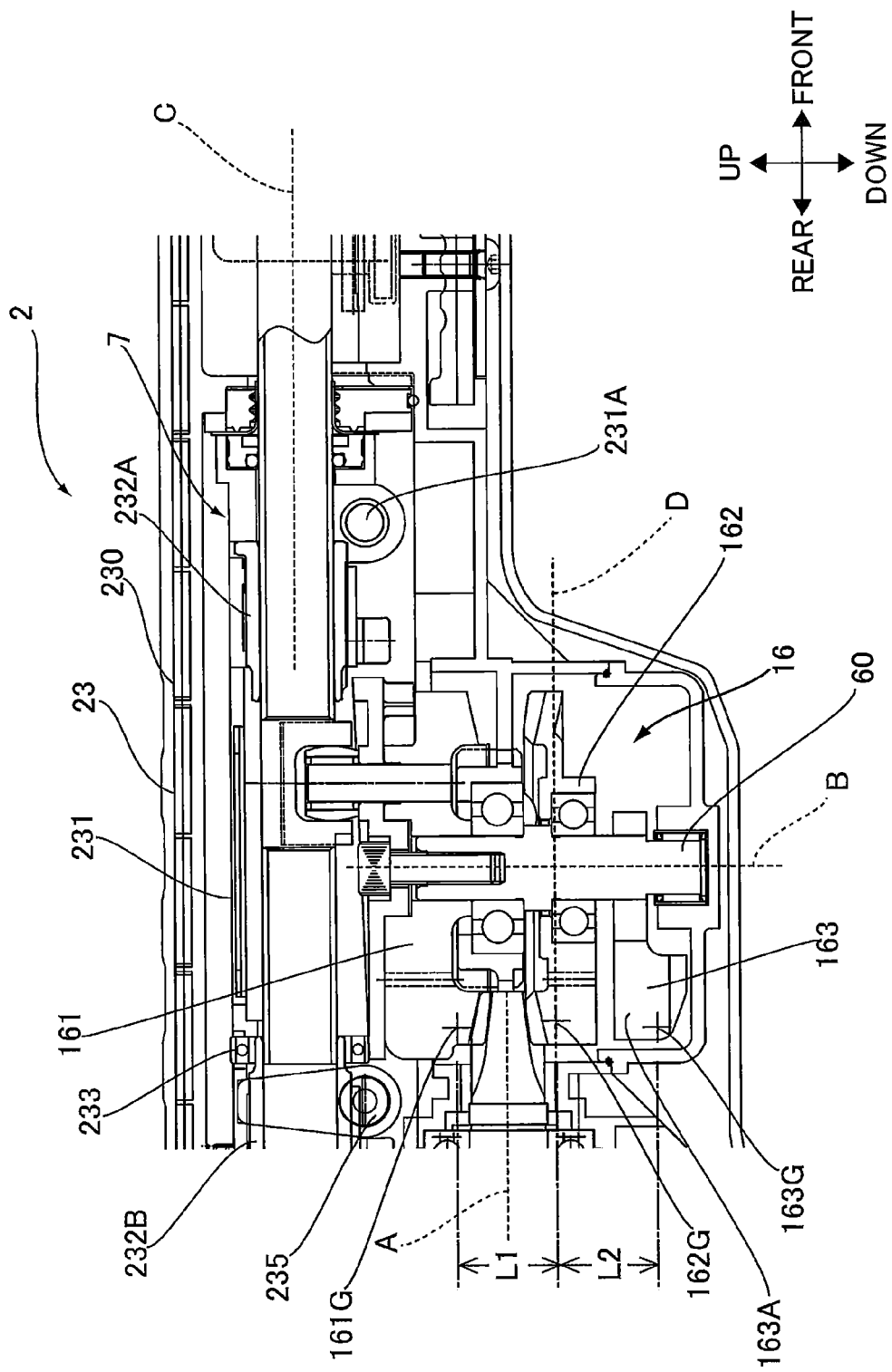
FIG. 12 is a detailed cross-sectional view illustrating a gear part, a plunger and in the vicinity thereof according to the second embodiment of the present invention.
Figure 13:
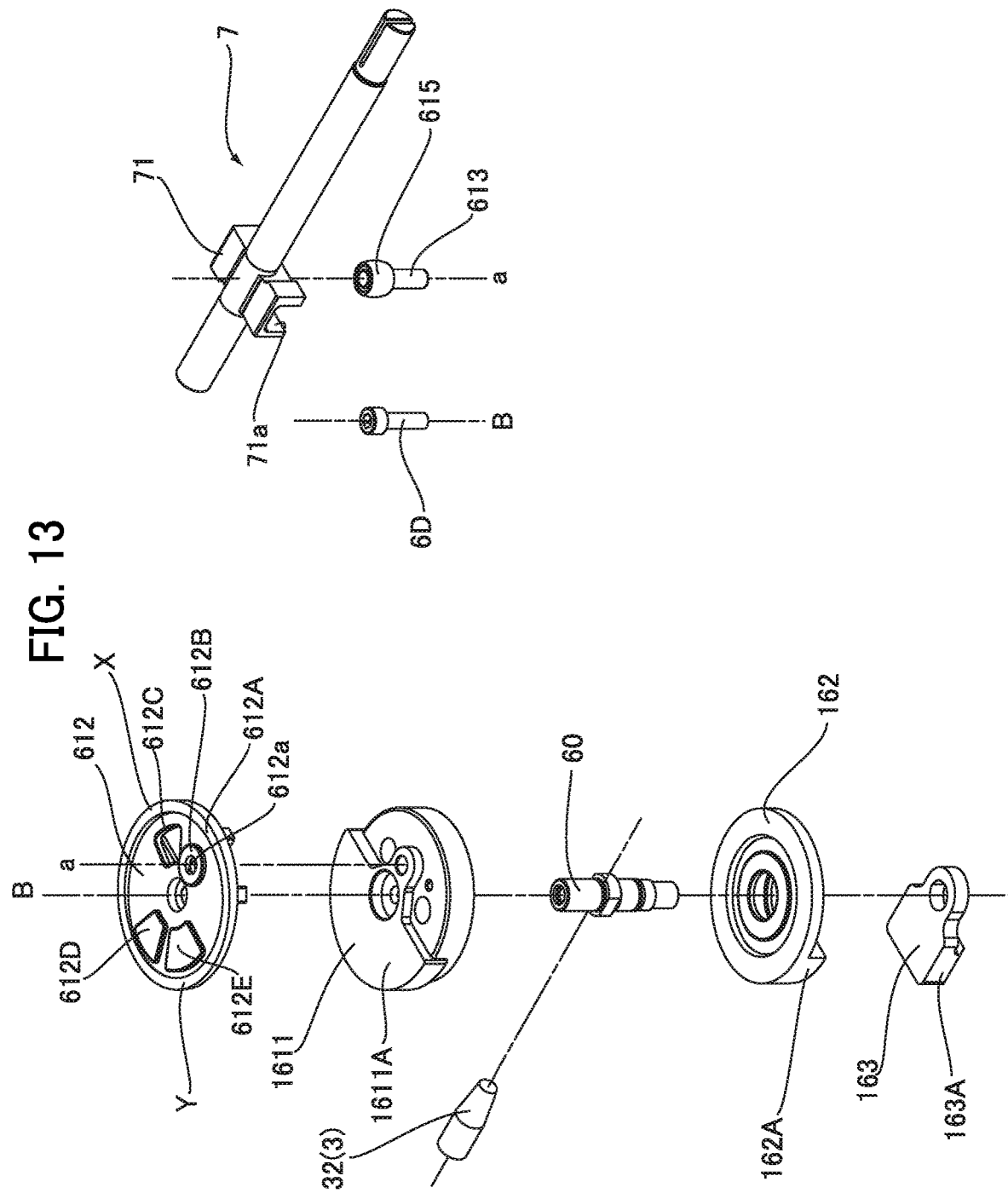
FIG. 13 is an exploded perspective view illustrating the gear part according to the second embodiment of the present invention.

As shown in FIGS. 12 and 13, the gear part 16 has a transmission gear part 161, a counter weight part 162, and a counter weight part 163.

The transmission gear part 161 has approximately the same configuration as the transmission gear part 61 of the saber saw 1 in the first embodiment, but differs from the transmission gear part 161 in the mass of the assembled body and the position of its center of gravity. As shown in FIG. 12, the transmission gear part has a center of gravity 161G constituting the center of gravity of its assembled body.

The counter weight part 162 has approximately the same configuration as the counter weight part 62 of the saber saw 1 in the first embodiment, but differs from the counter weight part 62 in the mass of the assembled body and the position of its center of gravity. As shown in FIG. 12, the counter weight part 162 has a center of gravity 162G constituting the center of gravity of its assembled body.

The counter weight part 163 is disposed beneath the counter weight part 162. The counter weight part 163 is fixed to the intermediate shaft 60 so as to rotate together with the intermediate shaft 60. The counter weight part 163 has an outer end portion in the radial direction of the inter mediate shaft 60. The outer end portion is provided with a weight 163A. The counter weight part 163 is an example of the "third rotary body" in the present invention.

The weight 163A constitutes a portion of the counter weight part 163 that is integrally formed with the other portions of the counter weight part 163. The weight 163A has a greater mass than the combined mass of all portions of the counter weight part 163 other than the weight 62A. The counter weight part 163 has a center of gravity 163G constituting the center of gravity of its assembled body.

Next, the following relationship of the transmission gear part 161, the counter weight part 162, and the counter weight part 163 is satisfied: $G4 \times R4 = G3 \times R3 + G5 \times R5$. Here, G3 is the combined mass of the bodies constituting the transmission gear part 161, and R3 is the distance from the axis B to the center of gravity 161G. Further, G4 is the combined mass of the bodies constituting the counter weight 162, and R4 is the distance from the axis B to the center of gravity 162G. Still further, G5 is the combined mass of the bodies constituting the counter weight part 163, and R5 is the distance from the axis B to the center of gravity 163G.

Hence, the product of the distance R4 from the axis B to the center of gravity 162G and the combined mass of the bodies constituting the counter weight part 162 is configured to be equivalent to the product of the distance R3 from the axis B to the center of gravity 161G and the combined mass of the bodies constituting the transmission gear part 161 plus the product of the distance R5 from the axis B to the center of gravity 163G and the combined mass of the bodies constituting the counter weight part 163. With this configuration, the magnitude of centrifugal force generated in the transmission gear part 161 and the counter weight part 163 can be made equivalent to the magnitude of centrifugal force generated in the counter weight part 162 when the transmission gear part 161, the counter weight part 162 and the counter weight part 163 rotates at the same angular velocity.

Next, a cutting operation for cutting a workpiece (a metal pipe, for example) using the saber saw 100 according to the present embodiment and the operations of the saber saw 100 during the cutting operation will be described for both a case in which the switching part 235 is in the pressing position and a case in which the switching part 235 is in the release position. Parts of the description that overlap the description in the first embodiment will be omitted as appropriate.

Figure 14:
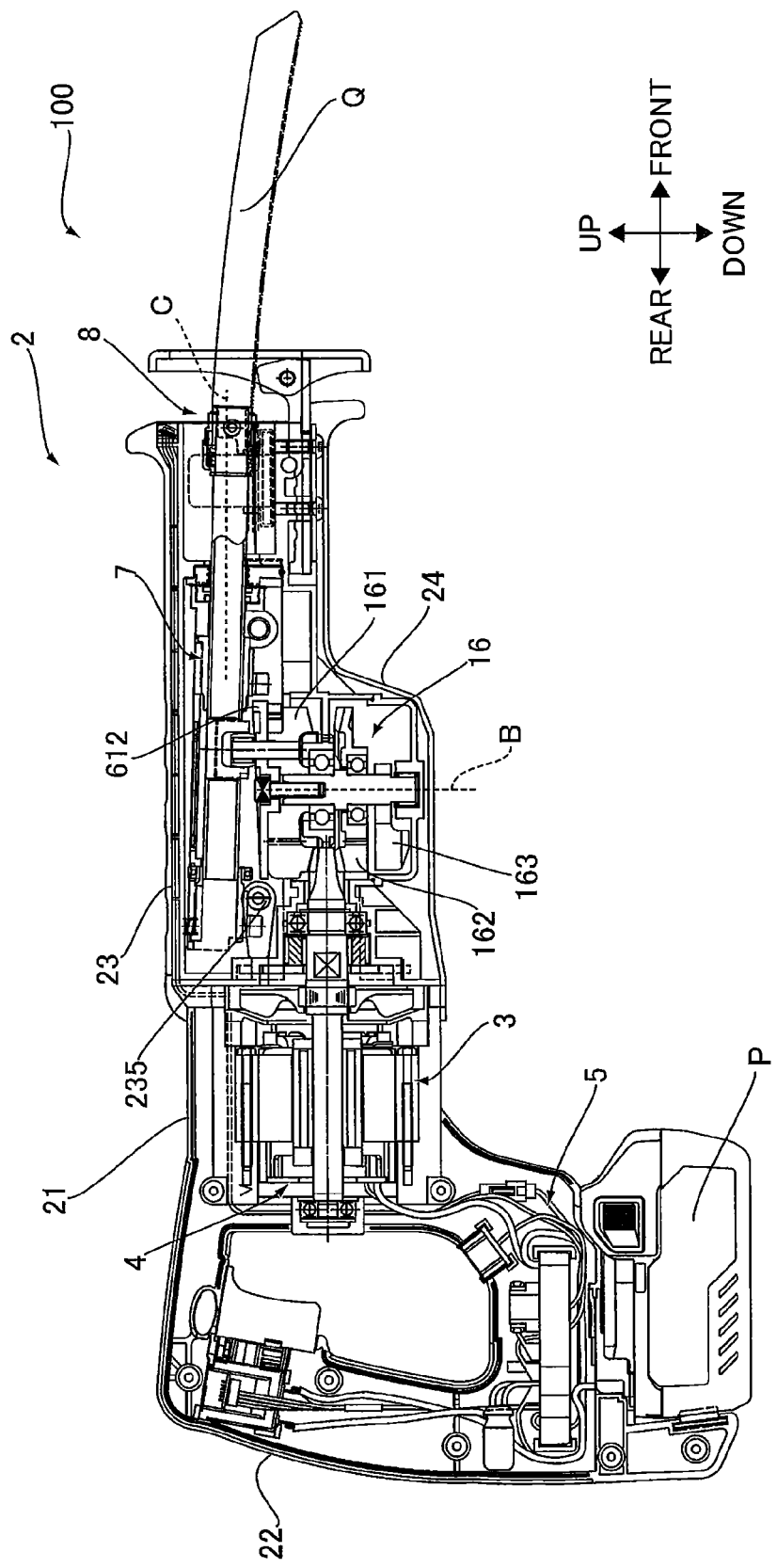
FIG. 14 is a cross-sectional view of an internal structure of the saber saw of the second embodiment of the present invention, illustrating a state where a switching part is in a release position while an output part is in a forward position.
Figure 15:
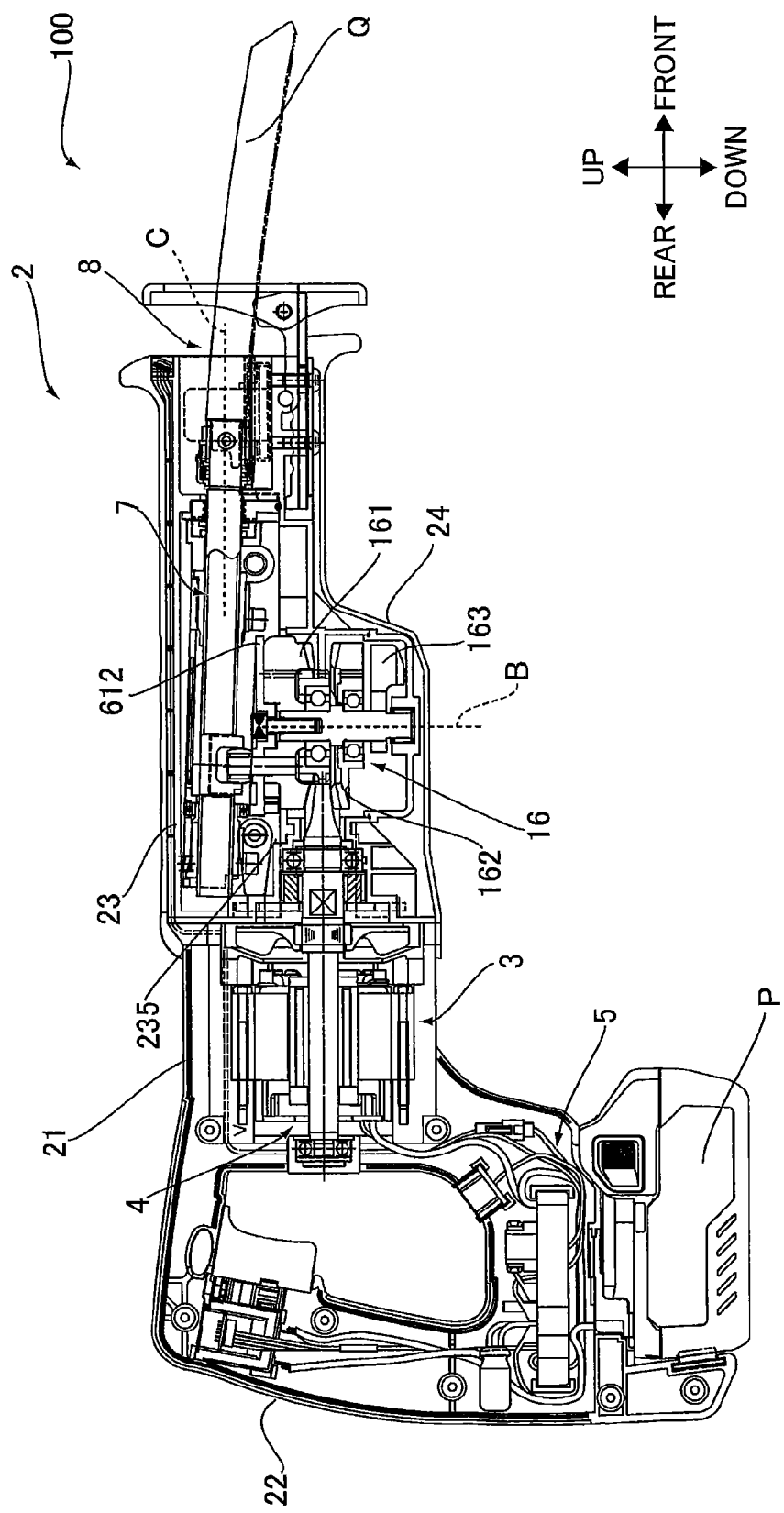
FIG. 15 is a cross-sectional view of the internal structure of the saber saw of the second embodiment of the present invention, illustrating a state where the switching part is in the releasing position while the output part is in a rearward position.

First, a case in which the switching part 235 is in the pressing position will be described with reference to FIGS. 14 and 15. In this state, the switching part 235 pushes the rear portion of the plunger cover 231 upward, maintaining the rail of the orbital guide in a state separated from the bearing. In other words, when the switching part 235 is in the pressing position, the plunger 7 and the plunger cover 231 do not pivot about the pivot shaft 231A. That is, when the switching part 235 is in the pressing position, an arbitrary fixed point on the blade Q does not move vertically.

Figure 16:
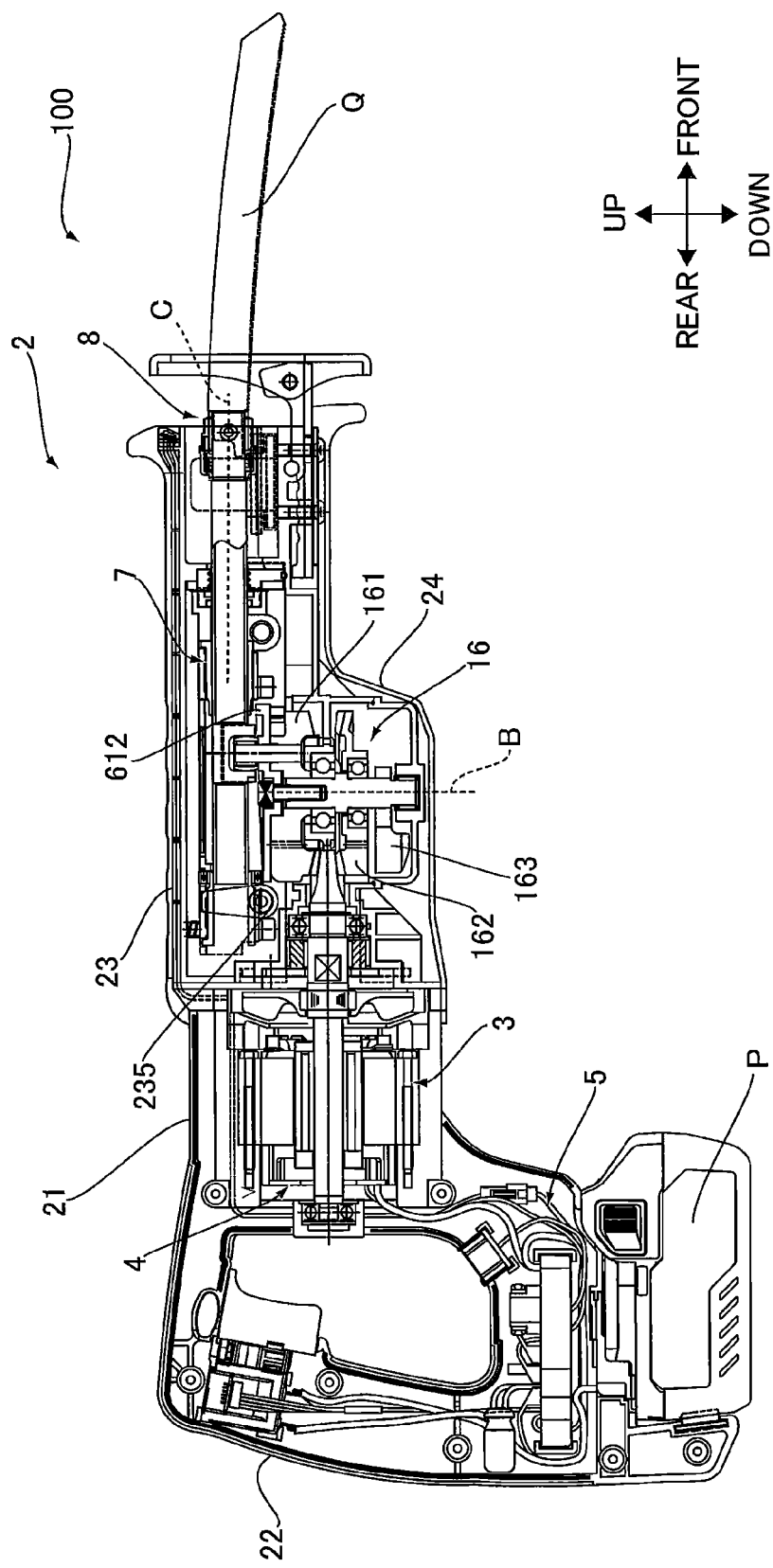
FIG. 16 is a cross-sectional view of the internal structure of the saber saw of the second embodiment of the present invention, illustrating a state where the switching part is in a pressing position while the output part is in the forward position.
Figure 17:
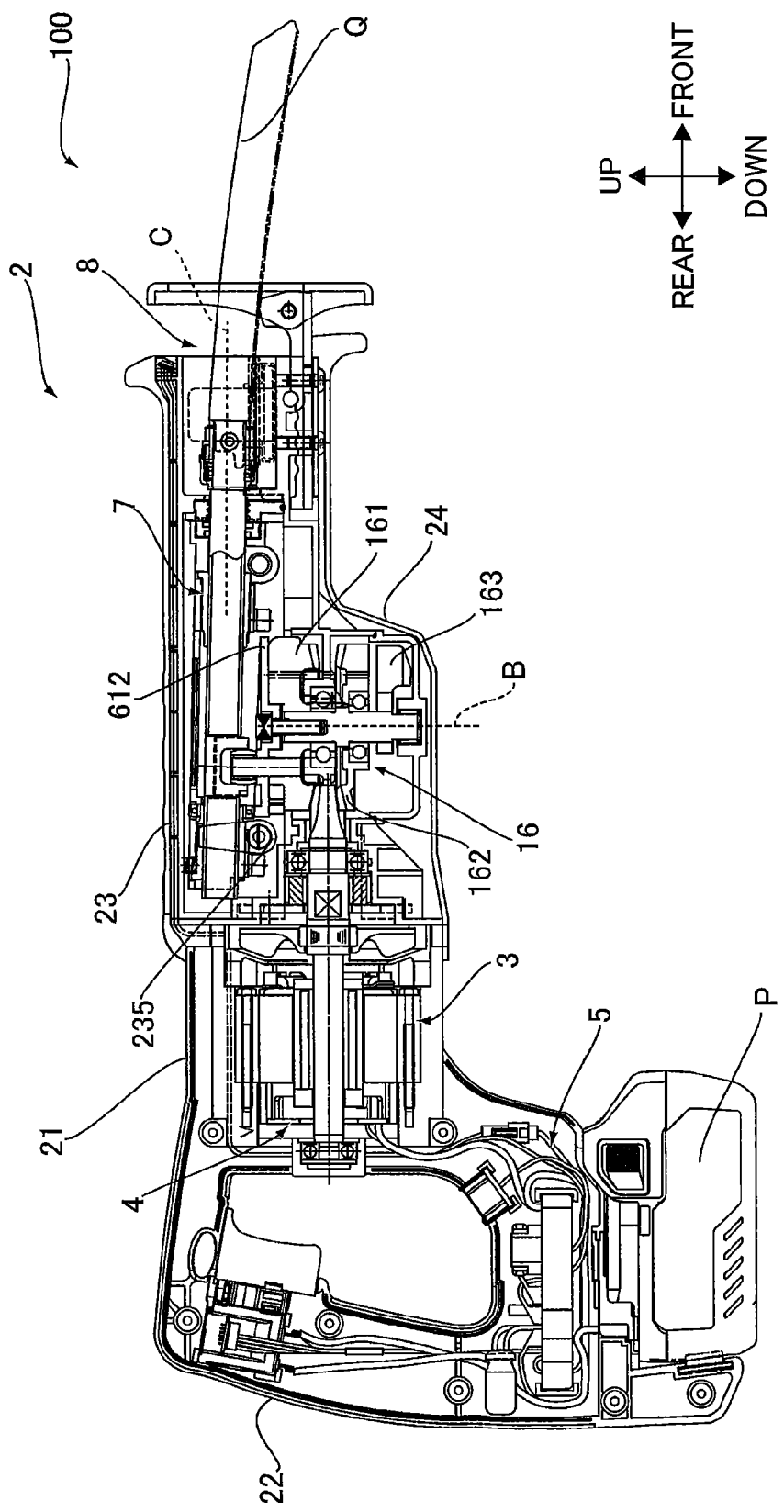
FIG. 17 is a cross-sectional view of the internal structure of the saber saw of the second embodiment of the present invention, illustrating a state where the switching part is in the pressing position while the output part is in the rearward position.

Next, a case in which the switching part 235 is in the release position will be described with reference to FIGS. 16 and 17. In this state, the blade Q moves with an elliptical motion in left-side and right-side views, also known as an orbital motion, when cutting the workpiece. Accordingly, the blade Q can quickly cut into the workpiece while moving rearward, improving work efficiency.

Next, the effects of the present embodiment will be described referring to FIG. 18.

Figure 18:
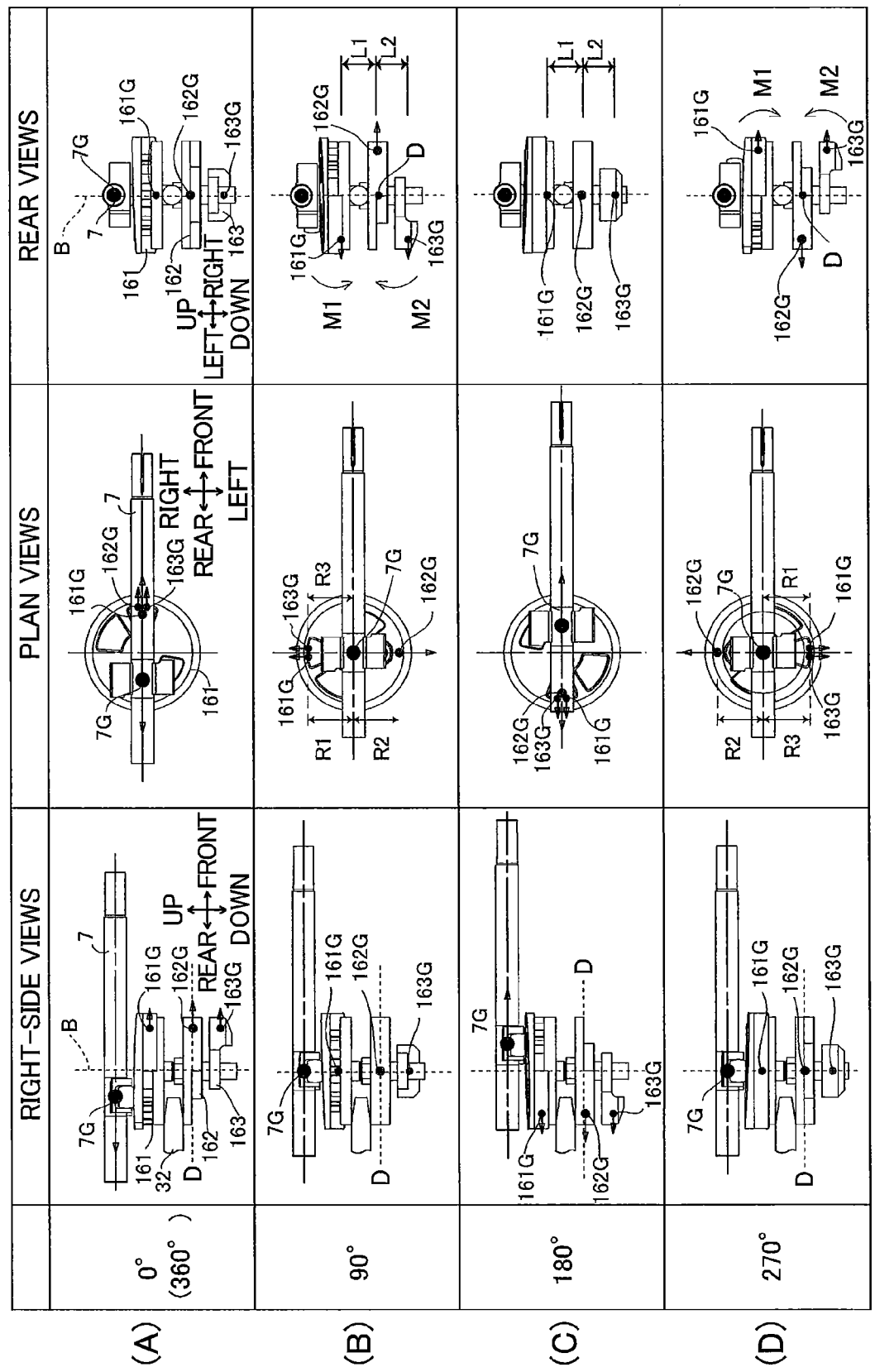
FIGS. 18A through 18D illustrates a positional relationship of a center of gravity of a first rotary body, a center of gravity of a second rotary body, a center of gravity of a third rotary body and a center of gravity of a reciprocating part of the saber saw according to the second embodiment of the present invention, illustrating circulating states over time of the center of the gravity of the weight in a sequence of 90 degrees intervals, in which each figure in the center column is a plan view, each figure in the right column is a rear view, and each figure in the left column is a right-side view.

FIG. 18 shows the positional relationship of the center of gravity 161G for the assembled body of the transmission gear part 161, the center of gravity 162G for the assembled body of the counter weight part 162, and the center of gravity 163G for the assembled body of the counter weight part 163 in plan views, right-side views, and rear views. FIGS. 18(a) through 18(d) shows the circulating states over time of the center of gravity 161G, the center of gravity 162G, and the center of gravity 163G in a sequence of 90 degrees intervals. FIG. 18(a) shows the state in which the plunger 7 is in the rearward position. FIG. 18(c) shows the state in which the plunger 7 is in the forward position. FIGS. 10(b) and 10(d) show intermediate states of the plunger 7 between the forward position and rearward position.

The center of gravity 7G in FIG. 18 denotes the center of gravity of the plunger 7. The center column in FIG. 10 shows positional relationship of the center of gravity 161G, center of gravity 162G, center of gravity 163G, and center of gravity 7G in plan views. The left column in FIG. 10 shows positional relationship of the center of gravity 161G, center of gravity 162G, center of gravity 163G, and center of gravity 7G in right-side views. The right column in FIG. 10 shows positional relationship of the center of gravity 161G, center of gravity 162G, center of gravity 163G, and center of gravity 7G in rear views. In each drawing, bold arrows indicate the trajectory of the center of gravity 161G, center of gravity 162G and center of gravity 163G and the direction and magnitude of inertial force or centrifugal force generated at each center of gravity.

When the plunger 7 is in the forward position shown in FIG. 18(c), the center of gravity 161G and center of gravity 162G are positioned in the rearmost part of their rotational orbits. When the plunger 7 is in the rearward position shown in FIG. 18(a), the center of gravity 161G and center of gravity 162G are positioned in the forwardmost part of their rotational orbits.

Hence, when the pin guide 71, plunger 7, blade mounting part 8, and blade Q mounted in the blade mounting part 8 are in their forward positions or their rearward positions, the center of gravity 161G, center of gravity 162G, and center of gravity 163G are positioned on the opposite side of the axis B from the center of gravity 7G. In other words, the center of gravity 161G, center of gravity 162G, and the center of gravity 163G are separated farthest from the blade mounting part 8 is in the forward position and are closest to the blade mounting part 8 when the blade mounting part 8 is in the rearward position. This configuration can suppress vibrations in the reciprocating direction generated in the body of the saber saw 100 by the reciprocating motion of the blade mounting part 8 (the reciprocating part).

In a right-side view, the direction in which the center of gravity 161G and center of gravity 162G move is opposite the moving direction of the pin guide 71, plunger 7, blade mounting part 8, and blade Q. In other words, the moving direction of the center of gravity 161G and center of gravity 162G is opposite the moving direction of the center of gravity 7G of the plunger 7 in a right-side view, as indicated in the left side of FIGS. 18(a) through 18(d). Therefore, the front-rear directional component of inertia, i.e., centrifugal force, generated in the center of gravity 161G and center of gravity 162G is in the direction opposite that of the inertial force generated by reciprocating motion of the plunger 7. With this configuration, it is possible to suppress vibrations in the reciprocating directions generated in the housing 2.

While the present embodiment is configured to reduce vibrations in the reciprocating direction arising from the center of gravity 7G of the plunger 7 in the reciprocating part, the front-rear directional component of centrifugal force generated in the center of gravity 161G, the center of gravity 162G, and center of gravity 163G is directed opposite the inertial force generated by reciprocating motion of the reciprocating part. Accordingly, it is preferable that the masses of the plunger 7, pin guide 71, blade mounting part 8, and blade Q constituting the reciprocating part be configured so that the sum of inertial force generated by these masses is equivalent to the sum of the front-rear directional component of centrifugal force produced in the center of gravity 161G, center of gravity 162G, and center of gravity 163G.

Further, as indicated by the bold arrows in FIGS. 18(b) and 18(d), the centrifugal forces generated in the center of gravity 161G and center of gravity 162G have components in the left-right direction that are equivalent in magnitude and opposite in direction, thereby reducing or preventing vibrations in the left-right direction that are generated in the housing 2.

Here, an axis D shown in FIG. 18 will be defined. The axis D extends in the front-rear direction so as to pass through the intermediate shaft 60. Further, the axis D and the center of gravity 163G have the same vertical position (see FIG. 12).

As shown in FIGS. 18(b) and 18(d), a moment M1 around the axis D generated by the circular motion of the center of gravity 161G and a moment M2 around the axis D generated by the circular motion of the center of gravity 163G are in opposing directions and cancel each other.

Accordingly, vibrations in the rotating direction about an axis oriented in the front-rear direction of the saber saw 100, i.e., an axis extending in the reciprocating direction, are suppressed or prevented, even when the center of gravity 161G, center of gravity 162G, and center of gravity 163G are arranged symmetrically in the left-right direction, as illustrated in FIGS. 18(b) and 18(d).

Further, in order to mitigate vibrations generated in the saber saw 100, the moment M1 and moment M2 are preferably configured to have equivalent magnitudes, as illustrated in FIG. 18. That is, the equation G3×R3×L1=G5× R5×L2 is preferably satisfied. In particular, the equation G3×R3=G5×R5 is preferably met when distance L1 and distance L2 are equivalent.

As described above, rotation of the three rotary bodies, i.e., the transmission gear part 161, counter weight part 162, and counter weight part 163, not only can prevent or suppress vibrations from reciprocating motion, but also can prevent or suppress vibrations in the left-right direction of the saber saw 100. In addition, the distance between the axis B and the center of gravity 161G, the distance between the axis B and the center of gravity 162G, and the distance between the axis B and the center of gravity 163G can be set different from each other, enabling the shape and arrangement of the bevel gear 611 to be designed freely to conform to the shape of the housing 2. Since the center of gravity 162G is also configured to be closer to the axis B than the center of gravity 161G and center of gravity 163G as illustrated in FIG. 12, i.e., since the weight 62A is arranged closer to the axis B, the saber saw 100 can be made compact. Further, dividing the counterweight into a plurality of weights can increase freedom of design and decrease the size of the bevel gear 611 and weight 611A.

Further, since the counter weight part 162 is positioned between the transmission gear part 161 and counter weight part 163 in a direction along the axis B, moments around the direction of reciprocation can be generated in directions that cancel each other.

The counter weight part 162 and the counter weight part 163 need not be provided with a function that transmit load to other members, but may be a member with inferior strength to material formed by die-cutting, and consequently can be manufactured at a cheaper cost. The counter weight part 162 and the counter weight part 163 have numerous fine holes through which lubricant can pass. Accordingly, when the counter weight part 162 and the counter weight part 163 is driven, the centrifugal force of the counter weight part 162 and the counter weight part 163 move and supply lubricant to the parts of the gear unit 16. Supplying lubricant in this way can prolong the life of the entire internal mechanism of the saber saw 100 and contribute to smooth driving.

In the present embodiment, the blade Q can efficiently cut a workpiece by performing an orbital motion. In particular, when the blade Q moves forward to begin cutting the workpiece, centrifugal force directed rearward is generated at the center of gravity 161G, center of gravity 162G, and center of gravity 163G, causing the saber saw 100 to rotate in a right-side view (causing the saber saw 100 to rotate clockwise in FIG. 11) and producing a moment for moving the blade Q downward. In this way, the blade Q can efficiently cut into the workpiece. Further, the moment described above can be increased since the center of gravity 162G and center of gravity 163G of the respective counter weight part 162 and counter weight part 163 that have a greater total mass in aggregate than the transmission gear part 161 in the present embodiment (in other words, when considering the counter weight part 162 and counter weight part 163 as a unit, their center of gravity is positioned nearer than the center of gravity 161G to the axis B) are separated farther than the center of gravity 161G below the plunger 7 and blade mounting part 8. In other words, the work efficiency of the saber saw 100 can be further improved by moments generated by the counter weight part 162 and counter weight part 163 for assisting with orbital motion. Note that the moments generated by the counter weight part 162 and counter weight part 163 are not dependent on the existence of orbital motion, enabling a saber saw without a function for orbital motion to achieve better work efficiency than a saber saw according to the conventional technology.

This completes a description of the invention according to the second embodiment. However, this embodiment is merely one example, and it would be apparent to those skilled in the art that many modifications and variations to the combination of components and the like may be made therein without departing from the spirit of the invention.

The counter weight part 163 may be formed in a blade shape or may be further provided with blade-shaped members. In such cases, the counter weight part 163 can stir lubricant inside the cover 234 to efficiently distribute the lubricant forward, rearward, leftward, and rightward.

The weight 162A and the weight 163A need not be configured integrally with the corresponding counter weight part 162 and counter weight part 163, as described in the embodiment, but may be configured as separate bodies that are assembled to the corresponding counter weight part 162 and counter weight part 163.

Next, a saber saw 200 will be described with reference to FIGS. 19 and 20. The saber saw 200 is an example of the reciprocating tool according to a third embodiment of the invention. The saber saw 200 has the same basic structure as the saber saw 1 according to the first embodiment and the saber saw 100 according to the second embodiment. The following description assigns the same reference numerals to identical structures in the saber saw 1 while omitting a description and structures when appropriate, and focuses primary on different structures and structures requiring a more detailed description. Further, the same configurations as the saber saw 1 and the saber saw 100 perform the effects as described in the description of the first and second embodiments.

Figure 19:
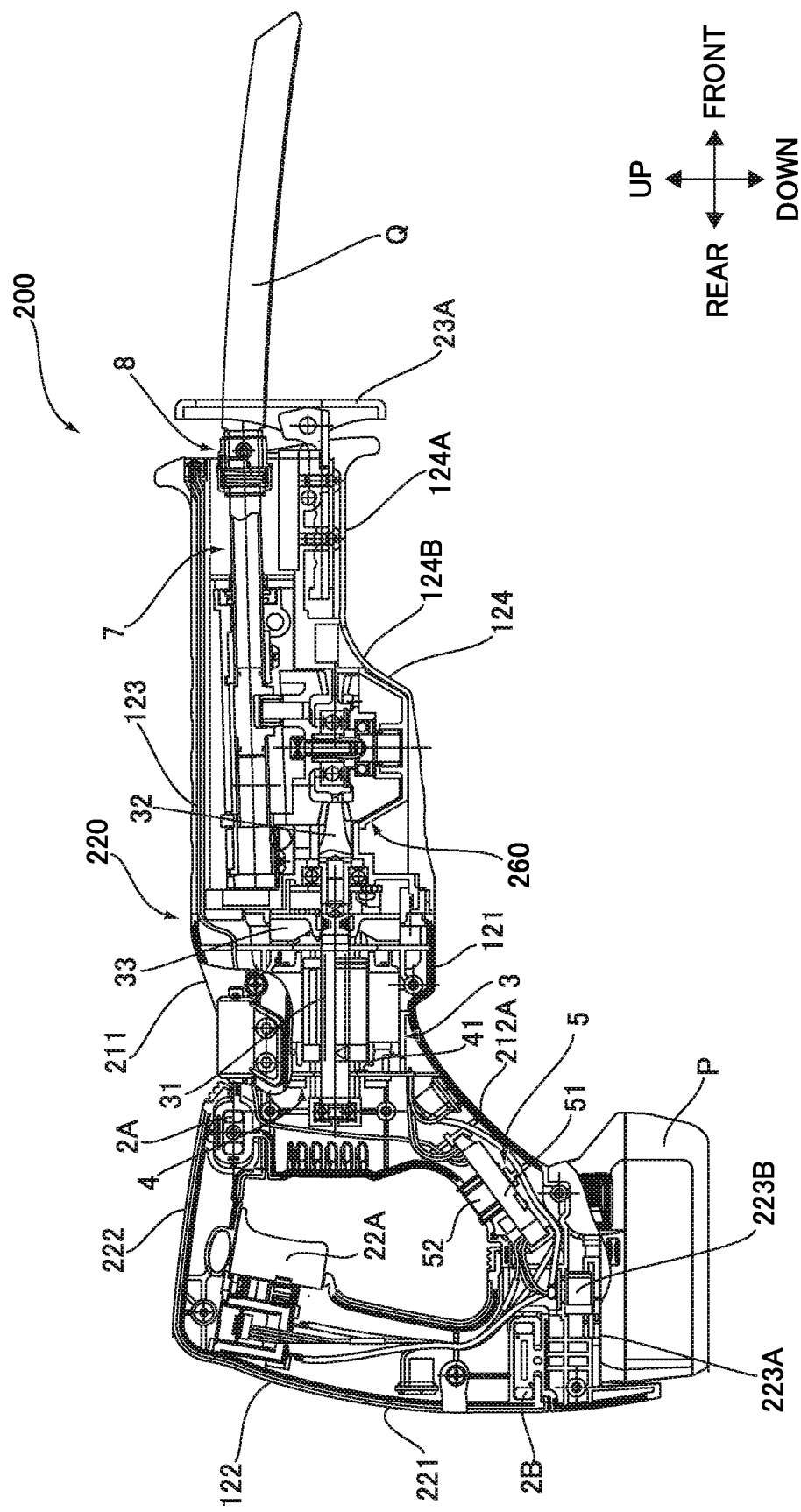
FIG. 19 is a cross-sectional side view illustrating an internal structure of a saber saw according to a third embodiment of the present invention.
Figure 20:
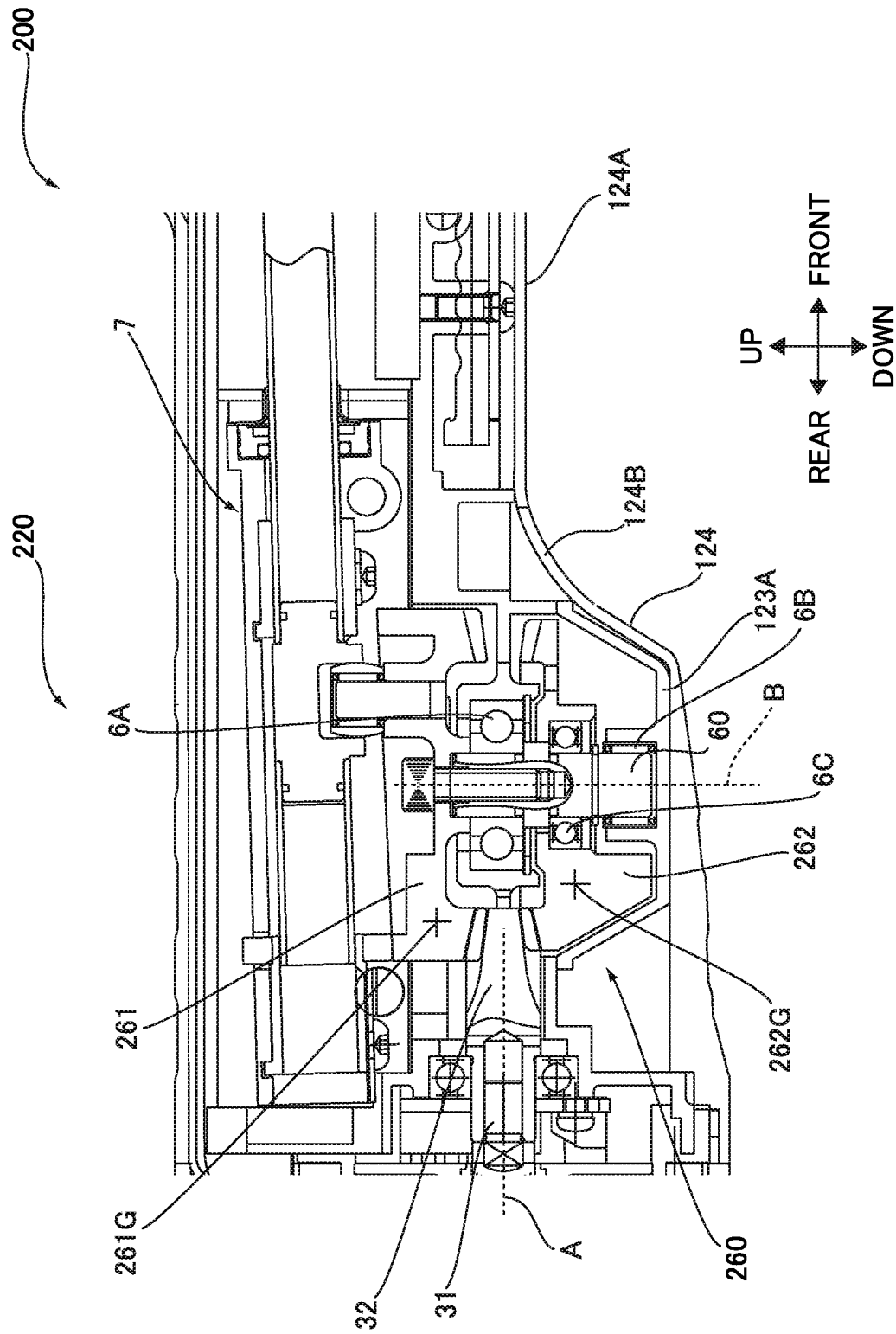
FIG. 20 is a detailed cross-sectional view illustrating a gear part, a plunger and in the vicinity thereof according to the third embodiment of the present invention.

As shown in FIGS. 19 and 20, the saber saw 200 as an example of the reciprocating tool according to the third embodiment of the invention has a housing 220 and a gear part 260.

The housing 220 has a motor housing 121, a handle housing 122, a gear housing 123, and front cover 124.

The motor housing 121 has an extension part 212A.

The extension part 212A extends in the downward and rearward direction from the bottom of the rear portion of the cylindrical part 211, and then extends rearward. The extension part 212A accommodates the control unit 5.

A first anti-vibration mechanism 2A is disposed between the front portion of the first connecting part 222 constituting the handle housing 122 and the top rear portion of the cylindrical part 211 constituting the motor housing 121. A second anti-vibration mechanism 2B is disposed between the bottom portion of the grip part 221 constituting the handle housing 122 and the top rear portion of the extension part 212A constituting the motor housing 121.

Each of the first anti-vibration mechanism 2A and second anti-vibration mechanism 2B has an elastic body that is expandable and retractable in the front-rear direction. Through expansion and retraction of these elastic bodies, the motor housing 121 and handle housing 122 are configured to be capable of moving relative to each other in the present embodiment. This configuration can suppress vibrations generated during cutting operations from being transmitted to the operator.

The gear housing 123 has a cover 123A.

The cover 123A is arranged to cover the bottom of the gear part 126. The cover 123A is formed in a general trapezoidal shape in a cross section and is disposed so as to protrude downward. The cover 123A supports the bottom of the gear part 126.

A grip part 124A is formed on the bottom of the front cover 124. The grip part 124A extends in the front-rear direction. The operator can grip the grip part 124A during operations. The grip part 124A includes a sloped part 124B.

The sloped part 124B is formed to slope downward toward the rear. Through the formation of the sloped part 124B, the operator need not twist the wrist of the hand gripping the grip part 124A in order to keep the palm parallel to the horizontal. By gripping the grip part 221 of the handle housing 122 with the other hand, the operator can suitably hold the body of the saber saw 200 in the present embodiment.

The gear part 260 has a transmission gear part 261, and a counterweight part 262.

The transmission gear part 261 has approximately the same configuration as the transmission gear part 61 of the saber saw 1 in the first embodiment, but differs from the transmission gear part 61 in the mass of the assembled body and the position of its center of gravity. As shown in FIG. 20, the transmission gear part 261 has a center of gravity 261G constituting the center of gravity of its assembled body.

The counterweight part 262 is formed such that its outer diameter narrows toward the bottom. The outer diameter of the counterweight part 262 at its bottom portion is smaller than the outer diameter of the bevel gear provided in the transmission gear part 261. The counterweight part 262 is provided with multiple fine holes. Accordingly, the counterweight part 262 can be used while the fine holes are infused with lubricant, and thus lubricant is also introduced into the counterweight part 262 of the present embodiment. The counterweight part 262 has a center of gravity 262G constituting the center of gravity for its assembled body.

In the present embodiment, the distance from the center of gravity 262G to the axis B differs from the distance from the center of gravity 261G to the axis B. More specifically, the center of gravity 262G is disposed in a location closer than the center of gravity 261G to the axis B. In other words, the distance between the center of gravity 261G and the axis B is shorter than the distance between the center of gravity 262G and the axis B in a direction orthogonal to the axis B (the front-rear direction). Further, the distance from the center of gravity 261G to the axis A is shorter than the distance from the center of gravity 262G to the axis A in a direction along the axis B (the vertical direction). That is, the vertical distance between the center of gravity 261G and the rotating shaft 31 is shorter than the vertical distance between the center of gravity 262G and the rotating shaft 31.

With this configuration, the saber saw 200 can be made compact since the center of gravity 262G for the assembled body of the counterweight part 262 is in proximity to the axis B. By arranging the center of gravity 262G for the assembled body of the counterweight part 262 in proximity to the axis B, the grip part 124A of the front cover 124 can be formed to include the sloped part 124B. Further, by arranging the center of gravity 262G near the axis B, the area of the grip part 124A can be increased and the region forward of the grip part 124A equivalent to this increase in area can be omitted to reduce the overall length of the saber saw 200, thereby achieving a saber saw 200 that is easy to grip and easy to operate.

In the present embodiment, a drive force can be transmitted directly from the pinion 32 to the gear part 261 and the counter weight part 262 without passing through other members. Further, the present embodiment enables a lightweight and compact design with an efficient layout for directly transmitting the drive force to the two gears. Still further, in the present embodiment, a space to dispose the counter weight part 262 is ensured by forming the needle bearing 6B located below so as to have a small diameter while the intermediate shaft 60 which directly receives a load during operations is firmly supported by two bearings (i.e., bearing 6A and needle bearing 6B), and the center of gravity 262G is arranged closer to the axis B (i.e., the weight of the counter weight part 262 is arranged closer to the axis B). With this configuration, since the sloped part 124B of the grip part 124A can be located farther rearward, compacting the size of the reciprocating tool can be achieved.

In the present embodiment, the blade Q can efficiently cut a workpiece by performing an orbital motion. In particular, when the blade Q moves forward to begin cutting the workpiece, centrifugal force directed rear ward is generated at the center of gravity 261G and the center of gravity 262G causing the saber saw 200 to rotate in a right-side view (causing the saber saw 200 to rotate clockwise in FIG. 19) and production a moment for moving the blade Q downward. In this way, the blade Q can efficiently cut into the workpiece. Further, the moment described above can be increased since the center of gravity 262G of the counter weight part 262 that has a greater total mass in aggregate (i.e., the center of gravity 262G is arranged closer to the axis B) is separated farther than the center of gravity 261G below the plunger 7 and the blade mounting part 8. In other words, the work efficiency of the saber saw 200 can be further improved by moments generated by the counter weight part 262 for assisting with orbital motion. Note that, the moments generated by the counter weight part 262 is not dependent on the existence of orbital motion, enabling a saber saw without a function for orbital motion to achieve better work efficiency than a saber saw according to the conventional technology.

This completes a description of the invention according to the third embodiment. However, this embodiment is merely one example, and it would be apparent to those skilled in the art that many modifications and variations to the combination of components and the like may be made therein without departing from the spirit of the invention.

In the present embodiment, the saber saw 1 is described as an example of the reciprocating tool. However, the present invention can be applied to other reciprocating tools that are driven by a motor such as jigsaw, reciprocating saw, hammer, hammer drill and the like.

REFERENCE SIGNS LIST

1: saber saw, 2: housing, 3: motor, 4: control board, 5: control unit, 6: gear part, 7: plunger, 8 blade mounting part

The invention claimed is:

1. A reciprocating tool comprising:
a housing;
a motor accommodated in the housing and including a rotating shaft;
an output part reciprocally and movably supported by the housing between a first position and a second position, the output part being configured to hold an end bit;
a first rotary body rotatable in a first direction about an axis extending in a predetermined direction intersecting a reciprocating direction of the output part by receiving a drive force of the motor; and a second rotary body rotatable in a second direction about the axis by receiving the drive force of the motor, the second direction being opposite to the first direction, wherein:

the first rotary body comprises:
   a first gear part rotatable about the axis by receiving the drive force of the motor;
   a protruding part provided at an eccentric position with respect to the axis; and
   a first weight part rotatable together with the first gear part, the output part is provided with a guide to transmit the drive force in the reciprocating direction to the output part by receiving the rotation of the protruding part, the second rotary body comprises:
   a second gear part rotatable about the axis by receiving the drive force of the motor; and
   a second weight part rotatable together with the second gear part, a mass of the first rotary body includes a mass of the protruding part and a mass of the first weight part, and a mass of the second rotary body includes a mass of the second weight part, and a product of a first distance and the mass of the first rotary body is equivalent to a product of a second distance and the mass of the second rotary body, the first distance being a radial distance of the first rotary body from the axis to a center of gravity of the first rotary body, and the second distance being a radial distance of the second rotary body from the axis to a center of gravity of the second rotary body, wherein:

the first rotary body further comprises an orbital guide rotatable together with the first gear part about the axis;

the orbital guide has a circular shape whose center is coincident with the axis, the orbital guide has an outer edge portion, the outer edge portion having a vertical thickness that varies along a circumferential direction, the housing is provided with a support part slidably supporting the output part, the support part comprises:
   a receiving part contactable with a part of an end portion of the outer edge portion in a thickness direction; and
   a swinging shaft;

when the orbital guide is rotated, the support part is pivotally movable about the swinging shaft with respect to the housing with a change in a contact position in an axial direction between the end portion of the outer edge portion and the receiving portion, and the mass of the first rotary body includes a mass of the orbital guide.

2. The reciprocating tool according to claim 1, wherein:
the protruding part comprises:
   a pin protruding from the first gear part toward the guide; and
   a connecting part provided between the pin and the guide and rotatable about the pin, and
the mass of the first rotary body includes a mass of the pin and a mass of the connecting part.

3. The reciprocating tool according to claim 2, wherein the guide is formed with a groove extending in a direction orthogonal to the reciprocating direction and an axial direction, the connecting part being movable in the groove.

4. The reciprocating tool according to claim 1, wherein:
the outer edge portion has a vertical thickness that varies along a circumferential direction with a thickest part and a thinnest part,
when the output part is positioned at the first position or the second position, a line connecting the thickest part and the thinnest part extends in a direction different from the reciprocating direction as viewed in the axial direction, and
the orbital guide has a part partially thickened and positioned inside of the thinnest part in a radial direction of the orbital guide.

5. The reciprocating tool according to claim 1, wherein the second distance is longer than the first distance.

6. The reciprocating tool according to claim 1, wherein a center of gravity of the second weight part is separated farther from the axis than a center of gravity of the first weight part is from the axis.

7. The reciprocating tool according to claim 1, wherein the first weight part and the first gear part are integral with each other.

8. The reciprocating tool according to claim 1, wherein the second weight part and the second gear part are integral with each other.

9. The reciprocating tool according to claim 1, wherein the second gear part has a strength lower than that of the first gear part.

10. The reciprocating tool according to claim 1, wherein the second gear part has a diameter decreased in an axial direction with an increasing distance from the output part.

11. The reciprocating tool according to claim 1, wherein:
a vibration in the reciprocating direction caused by the output part is counterbalanced by the first rotary body, and
a vibration in an intersecting direction caused by the first rotary body is counterbalanced by the second rotary body, the intersecting direction being a direction orthogonal to both the reciprocating direction and the predetermined direction.

12. A reciprocating tool comprising:
a housing;
a motor accommodated in the housing and including a rotating shaft;
an output part reciprocally and movably supported by the housing between a first position and a second position, the output part being configured to hold an end bit;
a first rotary body comprising a first gear part and a first weight part, the first gear part being rotatable in a first direction about an axis extending in a predetermined direction intersecting a reciprocating direction of the output part by receiving a drive force of the motor, the first weight part being provided at the first gear part so as to rotate together with the first gear part;
a motion converting part interposed between the first gear part and the output part in a transmission path of the drive force of the motor and converting the rotational motion of the first gear part to the reciprocating motion of the output part; and
a second rotary body comprising a second weight part rotatable in a second direction about the axis by receiving the drive force of the motor, the second direction being opposite to the first direction;
wherein a first radial distance between a center of gravity of the first weight part and the axis is shorter than a second radial distance between a center of gravity of the second weight part and the axis, wherein:
the first rotary body further comprises an orbital guide rotatable together with the first gear part about the axis;
the orbital guide has a circular shape whose center is coincident with the axis, the orbital guide has an outer edge portion, the outer edge portion having a vertical thickness that varies along a circumferential direction,
the housing is provided with a support part slidably supporting the output part,
the support part comprises:
  a receiving part contactable with a part of an end portion of the outer edge portion in a thickness direction; and
  a swinging shaft;
when the orbital guide is rotated, the support part is pivotally movable about the swinging shaft with respect to the housing with a change in a contact position in an axial direction between the end portion of the outer edge portion and the receiving portion, and
a mass of the first rotary body includes a mass of the orbital guide.

13. A reciprocating tool comprising:
a housing;
a motor accommodated in the housing and including a rotating shaft;
an output part reciprocally and movably supported by the housing between a first position and a second position, the output part being configured to hold an end bit;
a first rotary body comprising a first gear part and a first weight part, the first gear part being rotatable in a first direction about an axis extending in a predetermined direction intersecting a reciprocating direction of the output part by receiving a drive force of the motor, the first weight part being provided at the first gear part so as to rotate together with the first gear part;
a motion converting part interposed between the first gear part and the output part in a transmission path of the drive force of the motor and converting the rotational motion of the first gear part to the reciprocating motion of the output part; and
a second rotary body comprising a second weight part rotatable in a second direction about the axis by receiving the drive force of the motor, the second direction being opposite to the first direction, wherein:
the first rotary body further comprises an orbital guide rotatable together with the first gear part about the axis,
the orbital guide has a circular shape whose center is coincident with the axis, the orbital guide has an outer edge portion, the outer edge portion having a vertical thickness that varies along a circumferential direction with a thickest part and a thinnest part,
the housing is provided with a support part slidably supporting the output part,
the support part comprises:
  a receiving part that can be in contact with a part of an end portion of the outer edge portion in a thickness direction; and
  a swinging shaft;
when the orbital guide is rotated, the support part is swingable about the swinging shaft with respect to the housing with a change in a contact position in the axial direction between the end portion of the outer edge portion and the receiving portion,
the thinnest part is positioned opposite the thickest part with respect to the axis,
when the output part is positioned at the first position or the second position, a line connecting the thickest part and the thinnest part extends in a direction different from the reciprocating direction as viewed in an axial direction, and
the orbital guide has a part partially thickened and positioned inside of the thinnest part in a radial direction of the orbital guide.

14. A reciprocating tool comprising:
a housing;
a motor accommodated in the housing and includes a rotating shaft;
an output part reciprocally and movably supported by the housing between a first position and a second position, the output part being configured to hold an end bit;
a first rotary body rotatable in a first direction about an axis extending in a predetermined direction intersecting a reciprocating direction of the output part by receiving a drive force of the motor; and
a second rotary body rotatable in a second direction about the axis by receiving the drive force of the motor, the second direction being opposite to the first direction, wherein:
the first rotary body comprises:
  a first gear part rotatable about the axis by receiving the drive force of the motor;
  an orbital guide rotatable together with the first gear part about the axis; and
  a first weight part rotatable together with the first gear part,
the output part is provided with a guide to transmit the drive force in the reciprocating direction to the output part by receiving the rotation of a protruding part,
the second rotary body comprises:
  a second gear part rotatable about the axis by receiving the drive force of the motor; and
  a second weight part rotatable together with the second gear part,
the orbital guide has a circular shape whose center is coincident with the axis, the orbital guide has an outer edge portion, the outer edge portion having a vertical thickness that varies along a circumferential direction,
the housing is provided with a support part slidably supporting the output part,
the support part comprises:
  a receiving part contactable with a part of an end portion of the outer edge portion in a thickness direction; and
  a swinging shaft;
when the orbital guide is rotated, the support part is pivotally movable about the swinging shaft with respect to the housing with a change in a contact position in an axial direction between the end portion of the outer edge portion and the receiving portion,
a mass of the first rotary body includes a mass of the orbital guide and a mass of the first weight part, and a mass of the second rotary body includes a mass of the second weight part, and
a product of a first distance and the mass of the first rotary body is equivalent to a product of a second distance and the mass of the second rotary body, the first distance being a radial distance of the first rotary body from the axis to a center of gravity of the first rotary body, and the second distance being a radial distance of the second rotary body from the axis to a center of gravity of the second rotary body.

* * * * *